· US007428008B2

United States Patent
Okamoto et al.

(10) Patent No.: US 7,428,008 B2
(45) Date of Patent: Sep. 23, 2008

(54) VIDEO IMAGING DEVICE, VIDEO CONVERSION DEVICE, AND VIDEO EDITION DEVICE

(75) Inventors: Ichiro Okamoto, Neyagawa (JP); Akihira Sakai, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 673 days.

(21) Appl. No.: 10/508,342

(22) PCT Filed: Mar. 17, 2003

(86) PCT No.: PCT/JP03/03193

§ 371 (c)(1),
(2), (4) Date: Sep. 20, 2004

(87) PCT Pub. No.: WO03/079684

PCT Pub. Date: Sep. 25, 2003

(65) Prior Publication Data

US 2005/0104957 A1    May 19, 2005

(30) Foreign Application Priority Data

Mar. 20, 2002 (JP) ............... 2002-078373
Jul. 31, 2002 (JP) ............... 2002-222782
Jul. 31, 2002 (JP) ............... 2002-222998

(51) Int. Cl.
H04N 5/228 (2006.01)
H04N 11/20 (2006.01)
H04N 11/22 (2006.01)
H04N 7/01 (2006.01)

(52) U.S. Cl. .................. 348/222.1; 348/441; 348/443; 348/445

(58) Field of Classification Search .............. 348/97, 348/441–459, 221, 222.1; 386/131
See application file for complete search history.

(56) References Cited

U.S. PATENT DOCUMENTS

| 4,641,188 A | * | 2/1987 | Dischert | ............... 348/448 |
| 4,982,280 A | * | 1/1991 | Lyon et al. | ............... 348/448 |
| 5,191,427 A | * | 3/1993 | Richards et al. | ............... 348/97 |
| 5,329,309 A | * | 7/1994 | Dorricott et al. | ............... 348/97 |
| 5,510,902 A | * | 4/1996 | Fujinami et al. | ............... 386/123 |

(Continued)

FOREIGN PATENT DOCUMENTS

JP          10117327 A       5/1998

(Continued)

Primary Examiner—David Ometz
Assistant Examiner—Tuan H Le
(74) Attorney, Agent, or Firm—McDermott Will & Emery LLP

(57) ABSTRACT

When an image signal, which was picked up in a 24p image format and temporarily recorded on a temporary recording device, is read in a 60i image format, the image signal is subjected to a 2:3:2:3 pull-down conversion process so that it becomes possible to omit compressing/expanding processes. At this time, the reading operation is controlled on the basis of the figure of time codes so that the pull-down conversion system at the time of a joining image-pickup process is maintained. In this case, by properly switching controlling methods among a plurality of pull-down controlling methods, it is possible to achieve an image conversion system capable of providing an optimal image conversion process in accordance with desired image-pickup purposes and editing processes.

17 Claims, 14 Drawing Sheets

U.S. PATENT DOCUMENTS

| | | | | |
|---|---|---|---|---|
| 5,646,693 | A | * | 7/1997 | Cismas ........................ 348/441 |
| 5,828,786 | A | * | 10/1998 | Rao et al. ................... 382/236 |
| 6,055,018 | A | * | 4/2000 | Swan ......................... 348/448 |
| 6,111,610 | A | * | 8/2000 | Faroudja ..................... 348/441 |
| 6,222,589 | B1 | * | 4/2001 | Faroudja et al. ............. 348/448 |
| 2002/0101924 | A1 | * | 8/2002 | Suzuki et al. ............ 375/240.2 |

FOREIGN PATENT DOCUMENTS

JP          2001224029  A      8/2001

* cited by examiner

VIDEO IMAGING DEVICE, VIDEO CONVERSION DEVICE, AND VIDEO EDITION DEVICE

FIELD OF THE INVENTION

The present invention relates to an imaging system (e.g. video camera) which picks up an image in an image format of 24 frames/second, and outputs the image signal in an NTSC system (480/60i), a camera recorder which further has a recording function, an image conversion system which converts an image signal that has been picked up in the image format of 24 frames/second to an image signal in the NTSC system, or a device which extracts an image signal of 24 frames/second as picked up, from the signal recorded by the arrangement of the present invention, and again edits the signal.

BACKGROUND OF THE INVENTION

Conventionally, when an image signal, picked up in a progressive image format of 24 frames/second (hereinafter, this image signal is referred to as a 24p image signal), is recorded as an image signal in an interlace image format of 60 fields/second (hereinafter, this image signal is referred to as a 60i image signal), a conversion process referred to as a 2:3:2:3 pull-down system is generally carried out.

FIG. 14 schematically shows the process of the 2:3:2:3 pull-down system. In FIG. 14, frame data corresponding to consecutive 4 frames of 24p image signals are indicated as A, B, C and D. FIG. 14 shows the process in which the 60i image signal corresponding to these 4 frames is converted with the time axis thereof being adjusted. In these processes, frame data A of a 24p image signal are separated into field data (Ao) consisting of odd lines of the 60i image signals and field data (Ae) consisting of even lines thereof. These field data (Ao) and (Ae) are respectively recorded on areas of field numbers 1 and 2 of the 60i image signal. Successively, in the same manner, frame data b of the 24p image signal are recorded on areas of field numbers 3, 4 and 5 of the 60i image signal. Frame data C of the 24p image signal are recorded on areas of field numbers 6 and 7 of the 60i image signal. Frame data d of the 24p image signal are recorded on areas of field numbers 8, 9 and 10 of the 60i image signal. Thereafter, the above-mentioned processes (processes in which frame data corresponding to 4 frames of the 24p image signal are converted to field data, and then recorded on 10 fields of the 60i image signal in a partially overlapped state of 2:3:2:3) are carried out in a cycle of 4 frames of the 24p image signal. This conversion process corresponds to the 2:3:2:3 pull-down conversion process.

In recent years, techniques in which images are compressed on a frame basis and recorded have been widely used. In the above-mentioned 2:3:2:3 pull-down conversion process, when a compression process is further carried out, the process is carried out in the following manner. Here, the compression process is explained by exemplifying a case in which frame data A of frame number 1 of a 60i image signal shown in FIG. 14 are compressed. In this case, field data (Ao) and (Ae) of the 60i image signal that have been subjected to the 2:3:2:3 pull-down conversion process are once combined into frame data A, and then subjected to a compression process. Hereinafter, the 60i image signal which has been subjected to the 2:3:2:3 pull-down conversion process and compressed in this manner is referred to as the compressed 60i image signal (2:3).

Upon reproducing and editing, frame data as picked up (frame data of a 24p image signal) are extracted from the compressed 60i image signal (2:3). More specifically, the compressed 60i image signal (2:3) is inversely converted to a 24p image signal in a compressed state (hereinafter, referred to as the compressed 24p image signal). In this case, the frame data of the 24p image signal in its compressed state are extracted in order to reduce the amount of data and to prevent degradation in the image.

In this inverse conversion process, frame data A, B and D of the compressed 24p image signal are inversely converted from the field data stored in areas of frame numbers, 1, 2 and 5 of the compressed 60i image signal (2:3). Frame data C of the compressed 24p image signal are inversely converted from the field data stored in areas of frame numbers 3 and 4 of the compressed 60i image signal (2:3).

In this inverse conversion process, for example, field data (Ao) and field data (Ae) corresponding to frame A (frame number 1) of the compressed 60i image signal are first combined to frame data A, and then compressed. With this arrangement, the field data (Ao) and (Ae), extracted from the frame number 1 of the compressed 60i image signal (2:3) form frame data A of the compressed 24p image signal. In the same manner, the field data (Bo, Be) and (Do, De), extracted from the frame numbers 2 and 5 of the compressed 60i image signal (2:3) form frame data b, D of the compressed 24p image signal.

However, in the case when field data (Bo, Ce) and (Ce, Do) are extracted from areas of frame numbers 3 and 4 of the compressed 60i image signal (2:3) to form frame data C of the compressed 24p image signal, it is not possible to apply the above-mentioned inverse conversion process. In this case, compressed field data (Bo, Ce) and (Co, De) constituting two frames of frame number 3 and frame number 4 are respectively expanded. Hereinafter, the field data that have been expanded are referred to as the expanded field data. Moreover, frame data to be combined from the expanded field data are referred to as expanded frame data.

After the above-mentioned processes, expanded frame data C are composed from expanded field data (Ce) (field number 6) and expanded field data (Co) (field number 7). Then, the expanded frame data C are again compressed to form compressed field data C. Since the inverse conversion process is required to execute such operations, the corresponding processes takes a long time, and the repeated compressing and expanding processes inevitably cause degradation in the image quality.

The objective of the present invention is to eliminate the necessity of the above-mentioned compressing/expanding processes that are required upon carrying out inverse conversion, to properly maintain the image quality and to improve the processing rate.

DISCLOSURE OF THE INVENTION

In the present invention, upon recording an image of 4 frames as that of 10 fields, the recording process is carried out not in a 2:3:2:3 format, but in a 2:3:3:2 format. By carrying out such a format conversion process, frame data A, B, C and D can be extracted in their current form from data areas of frame numbers, 1, 2, 4 and 5, upon carrying out a format inversion-converting process.

With the process of the present invention, upon inverse-converting a format, even when an image signal has been compressed on a frame basis simultaneously with the format conversion, the frame data can be extracted in their current form without the necessity of the expanding/compressing processes, and subjected to a format inverse-converting process. Thus, it becomes possible to prevent degradation in the image quality due to compressing/expanding processes, and also to shorten required the processing time.

The present invention is provided with an imaging device which picks up an image signal in an image format of 24 frames/second, a temporary recording device which temporarily records the image signal picked up by the imaging device, and a 2:3:3:2 pull-down control device which reads the image signal from the temporary recording device in an interlace format of 60 fields/second.

Upon reading first to fourth consecutive frame data of the image signal as first to tenth consecutive field data, the 2:3:3:2 pull-down control device carries out the controlling steps of: reading odd field data of the first frame as the first field data; reading even field data of the first frame as the second field data; reading odd field data of the second frame as the third and fifth field data; reading even field data of the second frame as the fourth field data; reading odd field data of the third frame as the seventh field data; reading even field data of the third frame as the sixth and eighth field data; reading odd field data of the fourth frame as the ninth field data; and reading even field data of the fourth frame as the tenth field data.

With this arrangement, even in the case when a compressing process is carried out on a latter stage of an output on a frame basis, it becomes possible to extract the image signal as picked up without degradation in the image quality.

The present invention is also applicable to an image conversion system which has an input device that inputs an image signal having an image format of 24 frames/second, in place of the imaging device. In this case, when an image that has been picked up in the image format of 24 frames/second is input to an input device, the same effects as those described above are obtained.

The present invention is preferably provided with a recording device which records an image signal that has been converted by a 2:3:3:2 pull-down control device in an interlace system of 60 fields/second. This arrangement provides a higher degree of freedom in carrying image data. Moreover, the image data, recorded on a recording device, can be retrieved later without degradation in the image quality.

The present invention is preferably provided with a compressing device which, with respect to the first to tenth field data read from the temporary recording device, combines paired field data with each other into a piece of frame data, and then compresses the resulting data, and the recording device records the image signal that has been compressed by the compressing device. Thus, in addition to the above-mentioned effects, since the compressing process reduces the amount of data, it becomes possible to provide a recording process that lasts a longer time.

In another aspect of the present invention, an image conversion system is provided with: an input device to which a compressed image signal in an interlace system having a format of 60 fields/second, which has been combined and compressed on a frame basis, is input; a frame-data extracting control device which selectively extracts from the input device the first, second, fourth and fifth frame data among the first to fifth frame data that form the compressed image signal and are consecutively arranged with each other. With this arrangement, the compressed image signal in the interlace system having an image format of 60 fields/second to be input to the input device can be converted to an image signal having a progressive image format of 24/second without causing degradation in the image quality and can be extracted.

In still another aspect of the present invention, an image-editing device is provided with: an input device to which a compressed image signal in an interlace system having a format of 60 fields/second, which has been combined and compressed on a frame basis, is input; a frame-data extracting control device which selectively extracts from the input device the first, second, fourth and fifth frame data among the first to fifth frame data that form the compressed image signal and are consecutively arranged with each other; a recording/reproducing device which records/reproduces the compressed image signal extracted by the frame-data extracting control device; an image expanding device which expands the compressed image signal reproduced by the recording/reproducing device; an image output device which displays the expanded image signal; and an editing device which edits the compressed image signal reproduced from the recording/reproducing device on a frame basis. With this arrangement, the image signal input to the input device is extracted and edited without causing degradation in the image quality.

Moreover, in still another aspect, the present invention is provided with: an imaging device which picks up a first image signal in an image format of 24 frames/second; a temporary recording device which temporarily records the first image signal picked up by the imaging device; and a 2:3:3:2 pull-down control device which reads the first image signal from the temporary recording device as a second image signal having an image format of 30 frames/second.

The 2:3:3:2 pull-down control device carries out the controlling steps of: converting field data located at odd fields of a frame corresponding a time-code value $4n$ of the first image signal to field data located at odd fields of a frame corresponding a time-code value $5n$ of the second image signal; converting field data located at even fields of a frame corresponding a time-code value $4n$ of the first image signal to field data located at even fields of a frame corresponding a time-code value $5n$ of the second image signal; converting field data located at odd fields of a frame corresponding a time-code value $4n+1$ of the first image signal to field data located at odd fields of a frame corresponding a time-code value $5n+1$ of the second image signal; converting field data located at even fields of a frame corresponding a time-code value $4n+1$ of the first image signal to field data located at even fields of a frame corresponding a time-code value $5n+1$ of the second image signal; converting field data located at odd fields of a frame corresponding a time-code value $4n+1$ of the first image signal to field data located at odd fields of a frame corresponding a time-code value $5n+2$ of the second image signal; converting field data located at even fields of a frame corresponding a time-code value $4n+2$ of the first image signal to field data located at even fields of a frame corresponding a time-code value $5n+2$ of the second image signal; converting field data located at odd fields of a frame corresponding a time-code value $4n+2$ of the first image signal to field data located at odd fields of a frame corresponding a time-code value $5n+3$ of the second image signal; converting field data located at even fields of a frame corresponding a time-code value $4n+2$ of the first image signal to field data located at even fields of a frame corresponding a time-code value $5n+3$ of the second image signal; converting field data located at odd fields of a frame corresponding a time-code value $4n+3$ of the first image signal to field data located at odd fields of a frame corresponding a time-code value $5n+4$ of the second image signal; and converting field data located at even fields of a frame corresponding a time-code value $4n+3$ of the first image signal to field data located at even fields of a frame corresponding a time-code value $5n+4$ of the second image signal. In this arrangement, n is an integer of 0 to 5.

In this case, the present invention is preferably provided with a recording device that records the second image signal on a recording medium, and the recording device records the second image signal on the recording medium by a unit of 5 frames that corresponds to 1 sequence of the second image signal.

Preferably, the present invention is further provided with a recording start signal generator that generates a recording start signal that is set to a unit of 5 frames that corresponds to 1 sequence of the second image signal.

Preferably, the present invention is further provided with a time-code reading device that reads the time code of the second image signal recorded on the recording medium, and the recording device starts a recording process of the second image signal in phase-synchronism with the time code read by the time-code reading device.

Moreover, the recording device preferably records the second image signal based upon an interlace system of 60 fields/second.

Furthermore, the present invention is further provided with a compressing device which, with respect to the field data read from the temporary recording device, combines paired field data with each other into a piece of frame data, and then compresses the resulting data, and the recording device records the image signal that has been compressed by the compressing device.

With the above-mentioned arrangement, based upon the time codes attached to the image signal and 1 sequence (2:3:3:2 sequence) of the image signal, a recording process of an image is started from a time-code position of the start frame 5n of 1 sequence. Then, the recording process having 10 fields (5 frames) of the 2:3:3:2 pull-down system as 1 sequence is repeated periodically. Thus, image-pickup and joining image-pickup recording processes can be carried out with the 2:3:3:2 pull-down conversion system being maintained.

Moreover, in the case when an extracting process, which extracts a compressed image signal recorded on a 60i image format as an image signal having a 24p image format and which is a purpose of the 2:3:3:2 conversion system, is carried out, a thinning process is executed by eliminating image data corresponding to a time code value of 5n+2 of the first image signal so that the compressed signal of 24p can be restored.

Further, even in the case when an output image signal is compressed and recorded on a frame basis, the 24 frames as image-picked up can be extracted on a time-code basis without causing degradation in the image quality.

Moreover, the recording start point can be determined in phase-synchronism with the time code of the image signal and 1 sequence of the 2:3:3:2 pull-down conversion process.

Furthermore, a joining image-pickup process can be carried out in phase-synchronism with one sequence of the 2:3:3:2 pull-down conversion process.

In still another aspect of the present invention, an image conversion system is provided with an input device to which a first image signal having an image format of 24 frames/second is input, in place of an imaging device which picks up the first image signal having the image format of 24 frames/second. This arrangement also provides the same effects as described above.

In still another aspect of the present invention, each of an image conversion system and an image-editing device is provided with: an input device to which a compressed image signal in an interlace system having a format of 60 fields/second, which has been combined and compressed on a frame basis, is input and a frame-data extracting control device which extracts pieces of frame data located at frame positions corresponding to time-code values of 5n, 5n+1, 5n+3 and 5n+4 (n: an integer of 0 to 5) from the input device.

In this case also, it is possible to obtain the effect that the input image signal is extracted on a time-code basis without degradation in the image quality.

In still another aspect, the present invention is provided with a switching device which switches control operations of the reading device between the 2:3:3:2 pull-down control device and the 2:3:2:3 pull-down control device.

Moreover, the present invention is provided with a switching device which switches control operations of the reading device among the 2:3:3:2 pull-down control device, the 2:3:2:3 pull-down control device and the 2:2:2:4 pull-down control device.

In this case, it becomes possible to properly use various kinds of image conversion systems in a separate manner.

BEST MODES FOR CARRYING OUT THE INVENTION

Embodiment 1

Figure 1A:
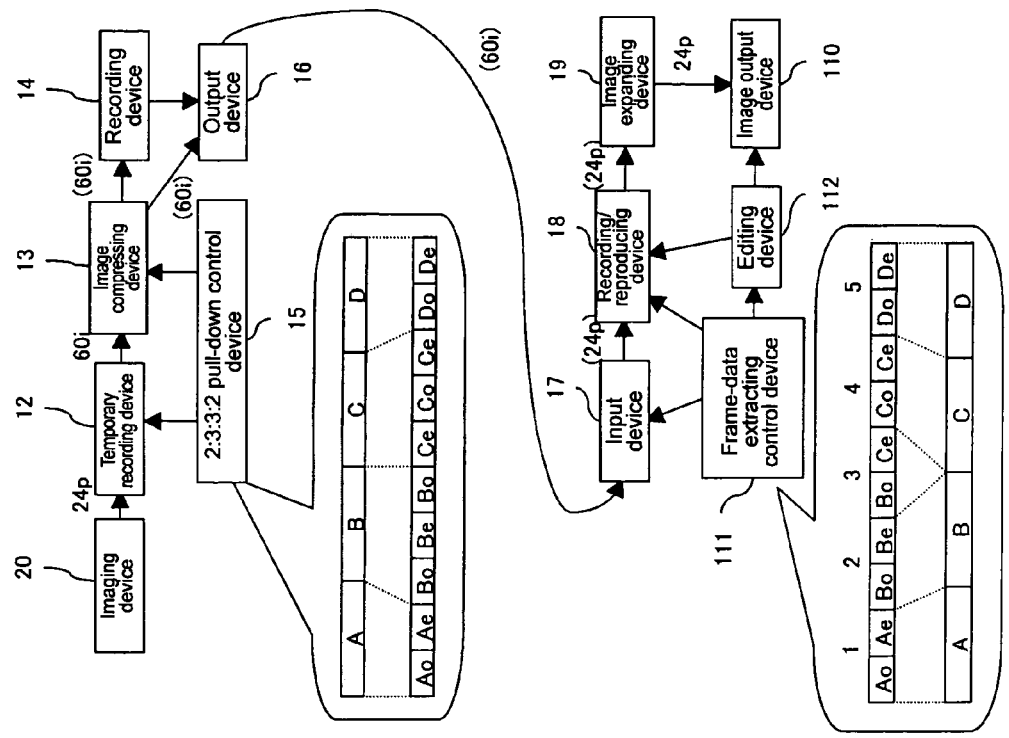
FIG. 1A is a block diagram that shows a structure of embodiment 1 of the present invention.

FIG. 1A is a block diagram that shows an image-editing system of embodiment 1 of the present invention. In this figure, arrows connecting respective blocks indicate processing directions of signals. Symbols, such as 24p and 60i, attached to the arrows respectively indicate the corresponding image formats of image signals flowing through the corresponding positions of the arrows, that is, 24p format (progressive image format of 24 frames/second) and 60i format (interlace image format of 60 fields/second). Parentheses attached to 24p and 60i indicate that the image signal flowing through the corresponding arrow position has been compressed.

This image-editing system is provided with an imaging system and an image-editing device. The imaging system is provided with an imaging device 11, a temporary recording device 12, an image compressing device 13, a recording device 14, a 2:3:3:2 pull-down control device 15 and an output device 16.

The image-editing device is provided with an input device 17, a recording/reproducing device 18, an image expanding device 19, an image output device 110, a frame data extracting control device 111 and an editing device 112. The image-editing device includes an image conversion system. The image conversion system is constituted by the input device 17 and the frame data extracting control device 111.

First, the following description discusses operations of the imaging system. The imaging device 11 picks up an image in a 24p image format, that is, an image format of 24 frames/second, through sequential scanning processes, and outputs the resulting image. The 24p image signal, output from the imaging device 11, is successively sent to a sequential temporary recording device 52. In the present embodiment, these consecutive frame data constituting the 24p image signal are referred to as frame data A, B, C, D . . .

The 24p image signal, output from the imaging device 11, is subjected to a 2:3:3:2 pull-down conversion process in a 4-frame cycle. The 2:3:3:2 pull-down conversion process, which is a conversion process that features the present invention, is controlled by the 2:3:3:2 pull-down control device 15. Upon 2:3:3:2 pull-down conversion process by the 2:3:3:2 pull-down control device 15, the temporary recording device 12 temporarily records the image signal that is being processed. The temporary recording device 12 is installed so as to allow the 2:3:3:2 pull-down control device 15 to carry out the 2:3:3:2 pull-down conversion process while offsetting a time lag between the writing timing of the 24p image signal and the reading timing of the 60i image signal.

The 2:3:3:2 pull-down control device 15 writes the 24p image signal output from the imaging device 11 in the temporary recording device 12 successively as consecutive frame data. The 2:3:3:2 pull-down control device 15 reads the 24p image signal written in the temporary recording device 12 in synchronized reading timing with the 60i image signal with the 24p image signal being decomposed into field data. Upon reading out, the 2:3:3:2 pull-down control device 15 controls the field data so as to be arranged in the image format of the 60i image signal.

Figure 2:
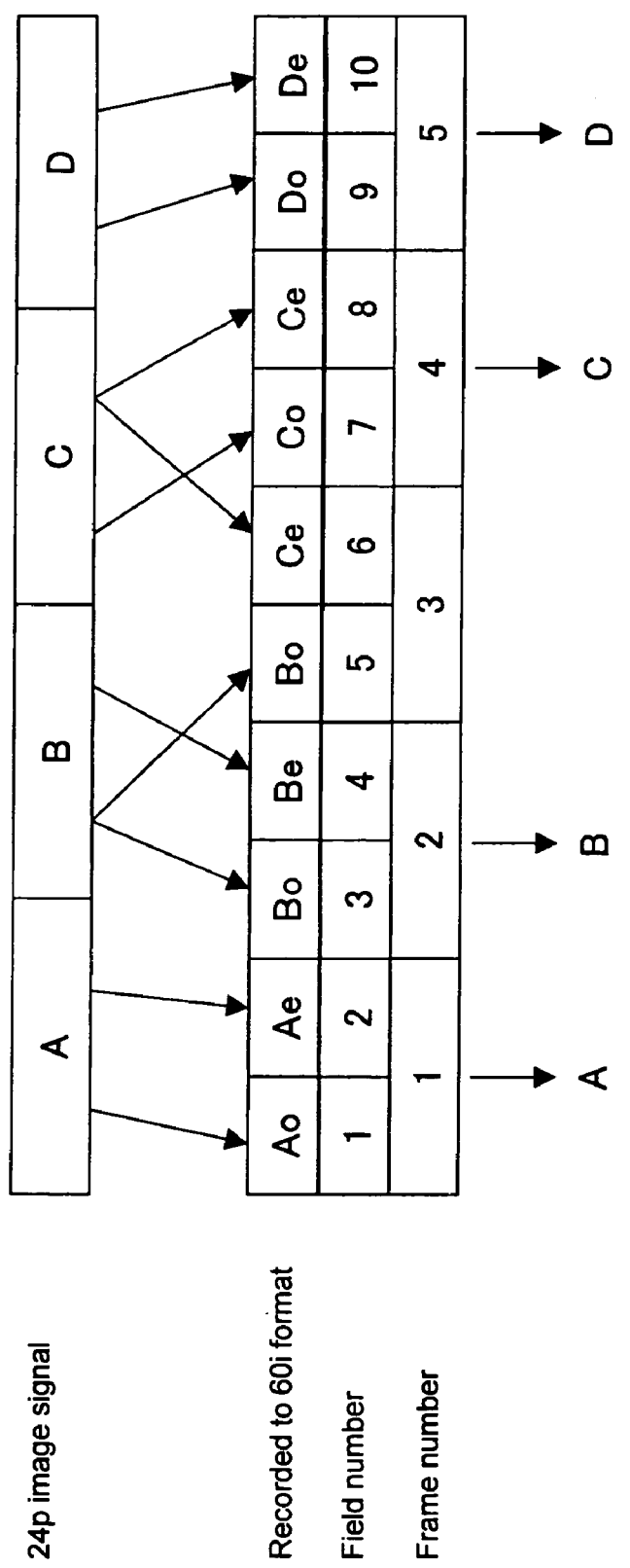
FIG. 2 is a schematic drawing that shows a relative relationship between a 2:3:3:2 pull-down control process and an image-pickup recording unit in embodiment 1.

Referring to FIG. 2, the 2:3:3:2 pull-down conversion process to be carried out by the imaging system is explained in detail. The 2:3:3:2 pull-down control device 15 writes frame data of the 24p image signal output by the imaging device 11 in the temporary recording pat 12. In this state, after decomposing the frame data recorded on the temporary recording device 52 into field data, the 2:3:3:2 pull-down control device 15 reads the resulting data in synchronized image timing with the 60i image signal. In this case, the image timing of the 60i image signal is synchronized with the image timing of the 24p image signal. The following description discusses the reading control in detail. In FIG. 2, symbol A attached to the 24p image signal indicates a first frame. Symbol B indicates a second frame. Symbol C indicates a third frame. Symbol D indicates a fourth frame. The field numbers 1 to 10, attached to the 60i image signal, indicate respective storing areas of the first to tenth field data.

First, in the former half timing of frame number 1 of the 60i image signal, field data (Ao) consisting of odd lines of frame data A of the 24p image signal is read from the temporary recording device 12 through an interlace process (jump scanning). Next, in the latter half timing of frame number 1 of the 60i image signal, field data (Ae) consisting of even lines of frame data A of the 24p image signal is read from the temporary recording device 12 through the interlace process.

In the timing of frame number 2 of the 60i image signal, frame data b of the 24p image signal is read from the temporary recording device 12 while being decomposed into field data (Bo, Be). At this time, the reading control is carried out in the same manner as the control in frame data A.

In the former half timing of frame number 3 of the 60i image signal, field data (Bo) consisting of odd lines of frame data b of the 24p image signal is read from the temporary recording device 12 through an interlace process. In the latter half timing of frame number 3 of the 60i image signal, field data (Ce) consisting of even lines of frame data C of the 24p image signal is read from the temporary recording device 12 through the interlace process.

In the timing of frame number 4 of the 60i image signal, frame data C of the 24p image signal is read from the temporary recording device 12 while being decomposed into field data (Co) and (Ce). At this time, the reading control is carried out in the same manner as the control in frame data A.

In the timing of frame number 5 of the 60i image signal, frame data d of the 24p image signal is read from the temporary recording device 12 while being decomposed into field data (Do) and (De). At this time, the reading control is carried out in the same manner as the control in frame data A.

The above-mentioned operations are periodically repeated in a 4-frame cycle of the 24p image signal.

Since the frame data constituting the 24p image signal is read out from the temporary recording device 12 in the order as described above while being decomposed into field data so that a 60i image signal is generated. The 60i image signal thus generated is successively sent to the image compressing device 13.

After combining the odd field data (o) and the even field data (e) constituting the respective pieces of frame data of the 60i image signal into one piece of frame data, the image compressing device 13 compresses the data respectively on a frame-unit basis. With respect to the frame compressing method, the generally-used DV compressing method can be used.

The compressed 60i image signal, compressed in the image compressing device 13, is sent to the recording device 14 and is recorded on a recording medium such as a magnetic tape or an optical disk. The compressed 60i image signal is simultaneously sent from the image compressing device 13 to the output device 16, and externally output.

With respect to the format used for outputting the compressed data, the generally-used IEEE1394 format can be used. Here, the compressed 60i image signal to be recorded on the recording device 14 can be extracted from the recording medium later in the recording device 14, and output from the output device 16.

Next, the inverse conversion process to be carried out by the image-editing device is explained. The inverse conversion process is a process which inversely converts the compressed 60i image signal to a compressed 24p image signal.

The compressed 60i image signal, output from the output device 16 of the image editing device is input to the input device 17 of the image-editing device. The compressed 60i image signal to be input to the input device 17 is controlled by the frame data extracting control device 111 in its recording process, and recorded on a recording medium by the recording/reproducing device 18. The recording control of the frame data extracting control device 111 is carried out in the following manner.

The frame data extracting control device 111 successively extracts pieces of compressed frame data (Ao, Ae), (Bo, Be), (Co, Ce), (Do, De), . . . that are located at frame numbers 1, 2, 4, 5, . . . from which frame number 5n−2 (n: natural number) is excluded, from the compressed 60i image signal to be input to the input device 17.

The frame data extracting control device 111 recognizes the extracted compressed frame data as compressed frame data of the compressed 24p image signal, and outputs these frame data to the recording/reproducing device 18 as a 24p image signal. The recording/reproducing device 18 records the input frame data on a recording medium in the 24p image format.

In this case, the compressed frame data, located at frame number 1, is frame data A of the compressed 60i image signal. Here, the compressed frame data corresponding to one frame of the compressed 60i image signal is identical to the compressed frame data corresponding to one frame of the compressed 24p image signal in the data format thereof. For this reason, the compressed frame data, located at frame number 1, to be extracted from the compressed 60i image signal is recorded on the recording medium in the recording/reproducing device 18 as the compressed frame data A of the compressed 24p image signal without degradation in the image quality. In the same manner, pieces of compressed frame data, located at frame numbers 2, 4 and 5 of the compressed 60i image signal are recorded on the recording medium in the recording/reproducing device 18 as the compressed frame data b, C and D of the compressed 24p image signal without degradation in the image quality. The compressed frame data, located at frame number 3 of the compressed 60i image signal, is read, but ignored.

Next, editing processes to be carried out in the image-editing device are explained. Upon carrying out the editing processes, first, the recording/reproducing device 18 reproduces the compressed 24p image signal. The reproduced compressed 24p image signal is subjected to an expanding process in the image expanding device 19 to be returned to a non-compressed 24p image signal. The 24p image signal, returned to the non-compressed state, is sent to the image output device 110, and displayed as an image. With respect to the image output device 110, for example, a display of a personal computer is used.

The user carries out editing processes while viewing an image displayed on the image output device 110. More specifically, the user specifies an editing start point and an editing terminal point of the image in the image editing device. The user specifies the editing start point and the editing terminal point in the same manner with respect to a plurality of image portions. Upon receipt of these processes, the image-editing device combines the image portions, and the resulting image is again recorded on the recording medium by the recording/reproducing device 18. Thus, the editing processes are completed. In this case, the editing device 112 records the editing start points, editing terminal points and the order of the sequences, and based upon the record, the image portions thus combined are displayed continuously on the image output device 110.

Figure 3:
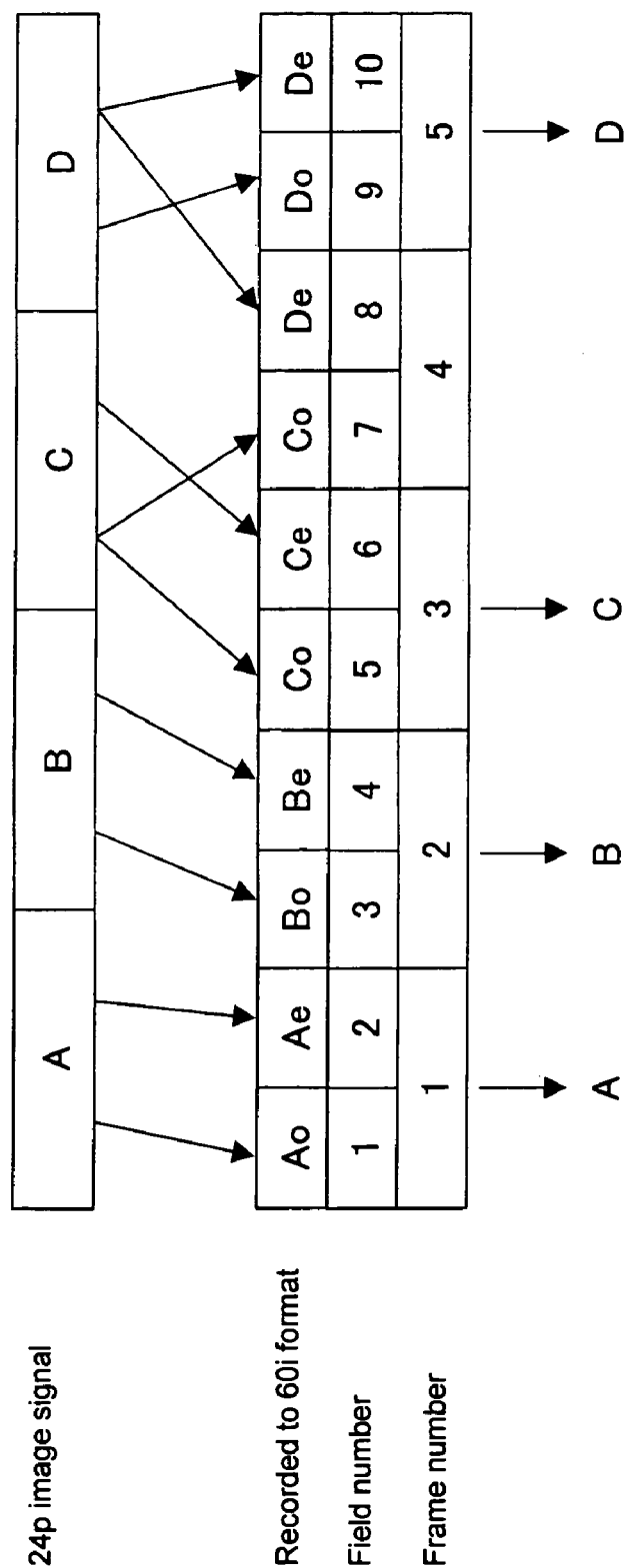
FIG. 3 is a schematic drawing that shows a relative relationship between a 2:2:3:3 pull-down control process and an image-pickup recording unit.
Figure 4:
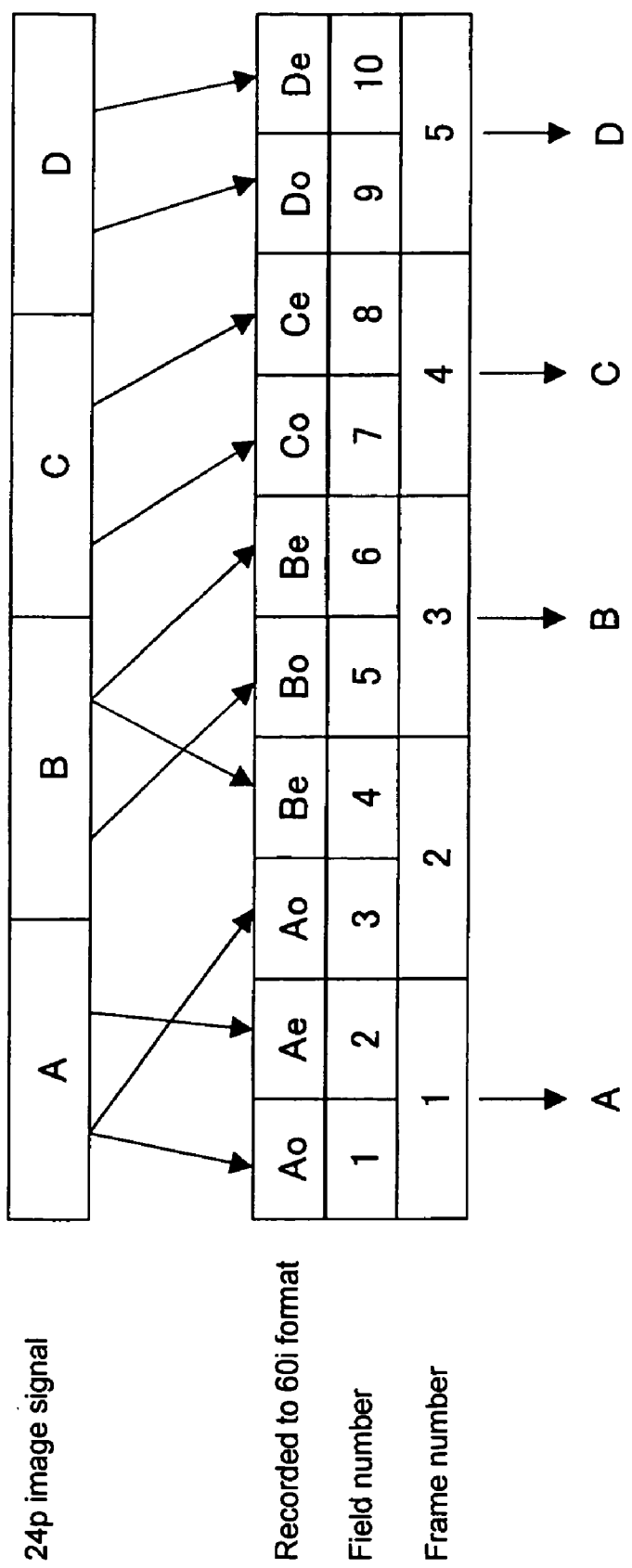
FIG. 4 is a schematic drawing that shows a relative relationship between a 3:3:2:2 pull-down control process and an image-pickup recording unit.

Here, the above-mentioned explanation has been given by exemplifying the 2:3:3:2 format as a format used for converting continuous 4 frames to continuous 10 fields. However, in addition to this, with respect to the format which allows the compressed frame data, as it is, to be extracted on its frame unit basis, a 2:2:3:3 pull-down conversion format, shown in FIG. 3, and a 3:3:2:2 pull-down conversion format, shown in FIG. 4, are listed.

These two pull-down conversion formats provide the same effects as the 2:3:3:2 pull-down conversion format shown in FIG. 2. In the case when the 2:3:2:3 pull-down conversion format, which has been currently widely used, is changed in its format, the 2:3:3:2 pull-down conversion format only needs to be changed in its one field among 10 fields, that is, only field data corresponding to field number 8; therefore, this format is superior in this point.

Figure 5:
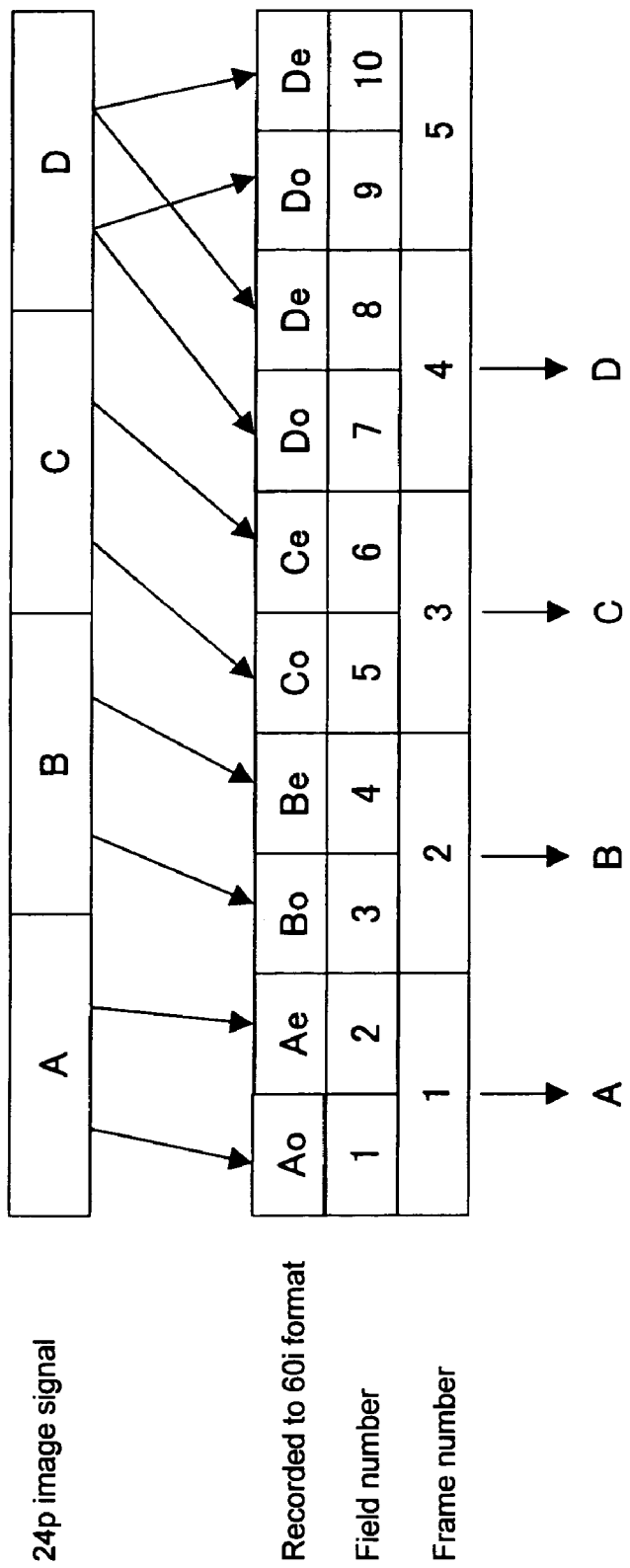
FIG. 5 is a schematic drawing that shows a relative relationship between a 2:2:2:4 pull-down control process and an image-pickup recording unit.

Additionally, the 2:2:2:4 pull-down conversion format, shown in FIG. 5, also provides the same effect. However, in this pull-down conversion format, upon reproducing an image, the frame data, located at frame position of "4" of the 24p image signal is placed in an overlapped manner at continuous frame positions in the 60i image signal; therefore, the resulting disadvantage is that movements in the image become discontinuous, causing an instantaneous unnatural stopped image.

In contrast, in the 2:3:3:2 pull-down conversion format, the length of frame data A, B, C and D of the 24p image signal upon picking up an image corresponds to 2 fields (1 frame) or 3 fields (1.5 frames) in the 60i image signal after the pull-down conversion so that it is possible to avoid the same frame data from being placed in an overlapped manner at continuous frame positions. The resulting advantage is that the movements of the image are continuous and smooth, and appear to be natural movements.

Figure 1B:
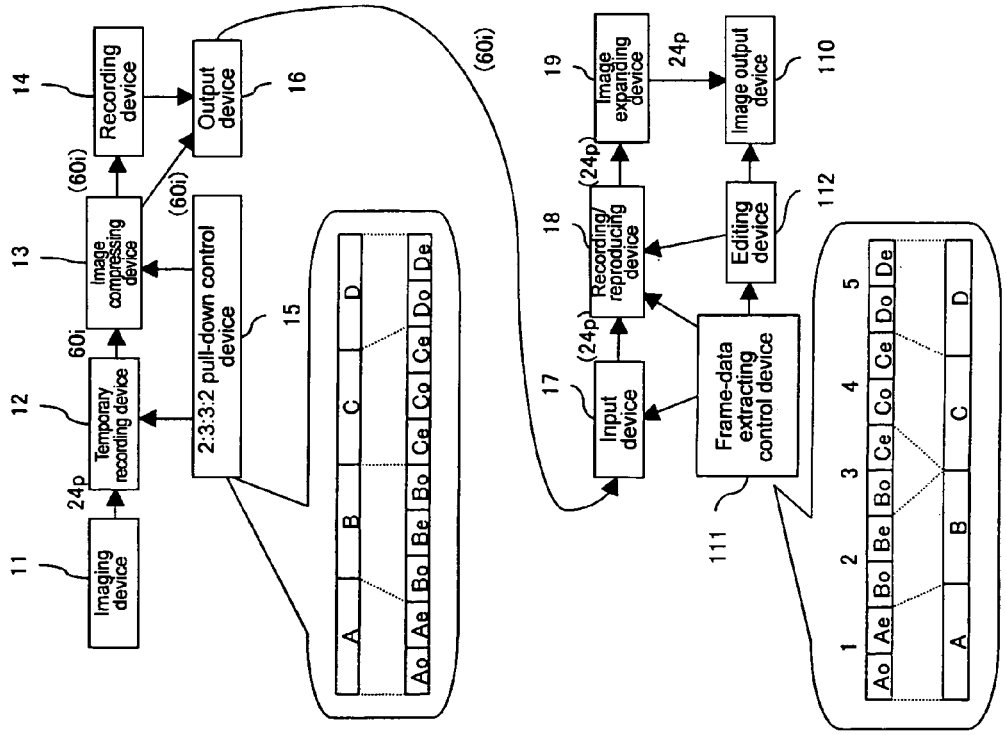
FIG. 1B is a block diagram that shows an essential portion of a modified example of embodiment 1.

In the above-mentioned embodiment 1, the present invention is applied to an image-editing system provided with an imaging system. In addition to this arrangement, as shown in FIG. 1B, embodiment 1 may be applied to an image-editing system provided with an image conversion system to which a 24p image signal is input from an outside device, in the same manner. The image-editing device forming this image-editing system is the same as the one shown in FIG. 1A. For this reason, in FIG. 1B, only the image conversion system is disclosed. The basic structure of this image conversion system is the same as that of the imaging system shown in FIG. 1A. The only difference from the one shown in FIG. 1A is that, in place of the imaging device 11, an input device 20 to which a 24p image signal is input from outside is placed therein.

Embodiment 2

In general, in the imaging system, recording start points and recording terminal points are set on a 1-frame basis. For this reason, in the case when a joining image-pickup recording process is carried out on a 1-frame basis while the 2:3:3:2 pull-down conversion process and the compressing process are carried out simultaneously, it is necessary to maintain the data format of the 2:3:3:2 pull-down conversion system.

Moreover, when the 2:3:3:2 pull-down conversion process is widely used, sometimes there are cases in which a picked-up 24p image signal is recorded on a recording medium on which a normal 60i image signal has been recorded, and a joining image-pickup recording process of a 60i image signal that has been subjected to a 2:3:3:2 pull-down conversion process is carried out thereon. In this case, on the time code basis, it is necessary to maintain time continuity between the elapsed time on the normal 60i image signal and the elapsed time on the 60i image signal that has been subjected to the 2:3:3:2 pull-down conversion process.

The present embodiment provides an image-editing system that satisfies this requirement.

Figure 6:
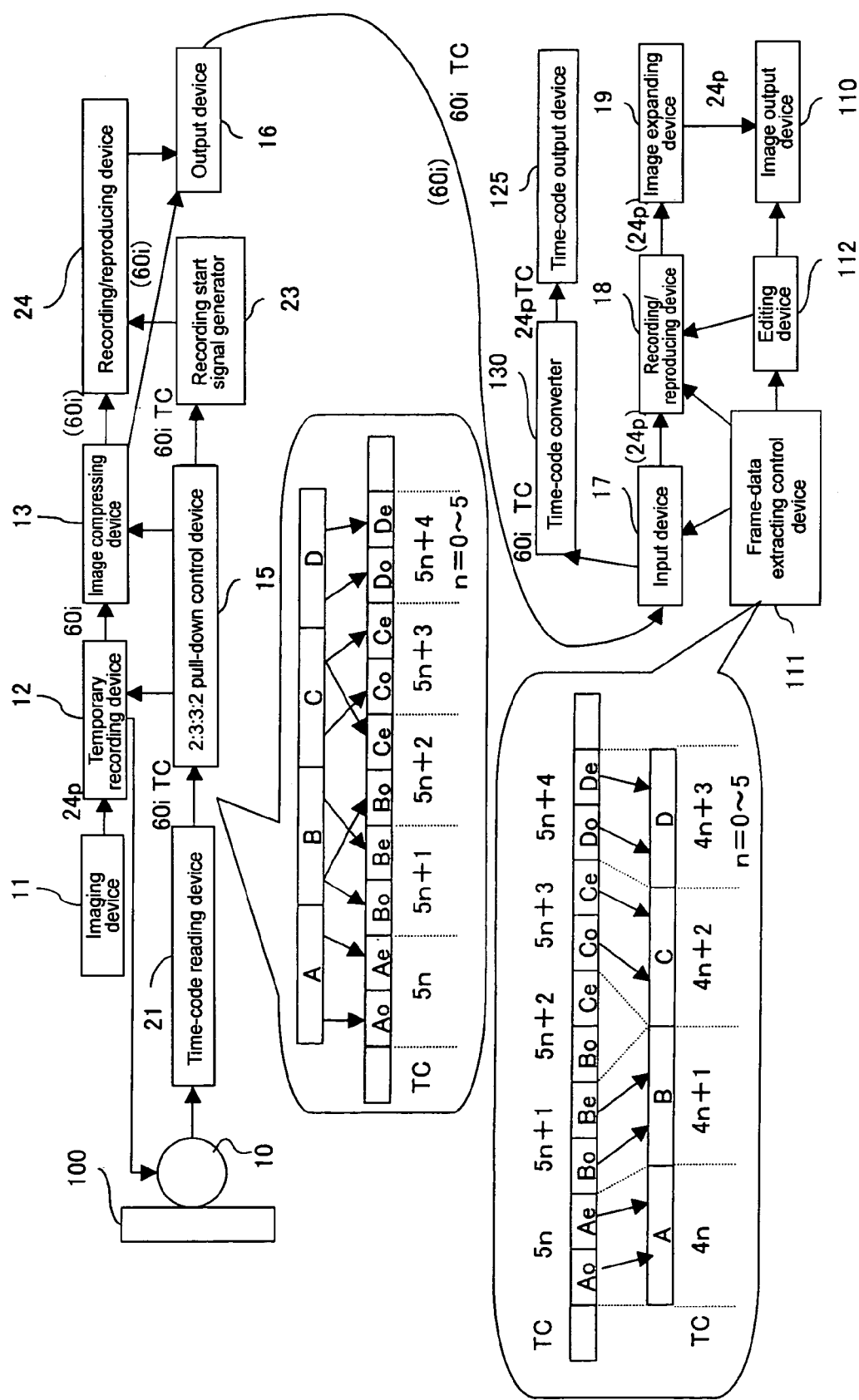
FIG. 6 is a block diagram that shows a structure of embodiment 2 of the present invention.

Referring to FIGS. 6 to 11, the following description discusses the present embodiment. FIG. 6 is a block diagram that shows a structure of an image-editing system in accordance with the present embodiment. The system structure of FIG. 6 is basically the same as the one shown in FIG. 1A. For this reason, the same parts are indicated by the same reference numerals, and the description thereof is omitted. Moreover, in these drawings, the time code of the 24p image signal is indicated as 24pTC, and the time code of the 60i image signal is indicated as 60iTC.

An imaging system forming this image-editing system is provided with an imaging device 11, a temporary recording device 12, an image compressing device 13, an output device 16, a time-code reading device 21, a 2:3:3:2 pull-down control device 22, a recording start signal generator 23 and a recording/reproducing device 24. Moreover, the temporary recording device 12 of the present embodiment generates a 60i servo reference signal, and supplies the signal to a cylinder head 10.

An image-editing device forming this image-editing system is provided with an input device 17, a recording/reproducing device 18, an image expanding device 19, a frame-data-extracting control device 111, an editing device 112, an image output device 110, a time-code converter 130, and a time-code output device 125.

First, the following description discusses operations of the imaging system. The time-code reading device 21 reads 60iTC from the 60i image signal recorded on a recording medium 100. This reading process is carried out in synchronism with a 60i servo reference signal. The time-code reading device 21 supplies the 60iTC thus read to the 2:3:3:2 pull-down control device 22. The 2:3:3:2 pull-down control device 22 reads frame data of the 24p image signal recorded on the temporary recording device 12. This reading process is carried in a manner so as to make the phase of the image timing of the 60i image signal and the phase of the frame timing of 60iTC coincident with each other.

Next, the following description discusses the reading control carried out by the 2:3:3:2 pull-down control device 22 in detail. Here, the reading control refers to a controlling process used for reading a 24p image signal from the temporary recording device 12. In the following explanation, 60iTC is defined to be code-arranged in a manner so as to successively repeat 60iTC (5n), 60iTC (5n+1), 60iTC (5n+2), 60iTC (5n+3) and 60iTC (5n+4) as 60iTC. Here, n represents an integer from 0 to 5.

First, in the former half timing of 60iTC (5n), field data (Ao) consisting of odd lines of frame data A of the 24p image signal are read from the temporary recording device 12 through an interlace process (jump scanning). Next, in the latter half timing of 60iTC(5n), field data (Ae) consisting of even lines of frame data A of the 24p image signal are read from the temporary recording device 12 through the interlace process.

In the same manner, in the timing of 60iTC (5n+1), pieces of field data (Bo), (Be) in frame B are read from the temporary recording device 12.

Next, in the former half timing of 60iTC(5n+2), field data (Bo) consisting of odd lines of frame data b are read from the temporary recording device 12 through an interlace process. In the latter half timing of 60iTC(5n+2), field data (Ce) consisting of even lines of frame data C are read from the temporary recording device 12 through the interlace process.

Next, in the timing of 60iTC (5n+3), pieces of field data (Co), (Ce) of frame C are read from the temporary recording device 12. The reading process is carried out in the same manner as 60iTC (5n).

Next, in the timing of 60iTC (5n+4), pieces of field data (Do), (De) of frame D are read from the temporary recording device 12. The reading process is carried out in the same manner as 60iTC (5n).

The above-mentioned processes are periodically repeated in a 4-frame cycle of the 24p image signal (24pTC). Thus, the 24p image signal, temporarily recorded on the temporary recording device 12, is converted to a 60i image signal in a state so as to correspond to 60iTC read from the recording medium 100 by the time-code reading device 21.

The 60i image signal after the conversion, output from the temporary recording device 12, is successively sent to the image compressing device 13 in phase-synchronism with the time-code frame reference of the recording medium 100. The image compressing device 13 carries out the following processes on the 60i image signal input thereto. In the 60i image signal, 2 pieces of field data consisting of consecutive odd field and even field are combined into 1 piece of frame data. Further, the image compressing device 13 compresses (in-frame compression) the combined frame data on a frame basis. The compressing process is carried out in the same manner as embodiment 1.

The compressed 60i image signal, compressed by the image compressing device 13, is supplied to the recording/reproducing device 24. At this time, the 2:3:3:2 pull-down control device 22 simultaneously supplies 60iTC to the recording start signal generator 23. The recording start signal generator 23 generates a recording start signal from the supplied 60iTC, and supplies the resulting signal to the recording/reproducing device 24. The recording start signal generator 23 sets a recording start point in the recording start signal based upon the conversion cycle of the 2:3:3:2 pull-down conversion process. More specifically, the recording start signal generator 23 makes the recording start point synchronized with the conversion start point (60iTC (5n)) of the 2:3:3:2 pull-down conversion process.

Based upon the recording start signal supplied thereto, the recording/reproducing device 24 records the compressed 60i image signal and the 60iTC on another recording medium, with the two signals being made in association with each other. With respect to another recording medium, for example, a magnetic tape and an optical disk may be used.

Upon recording by the use of the recording/reproducing device 24, the compressed 60i image signal is simultaneously sent to the output device 16 together with 60iTC from the image compressing device 13, and externally output as compressed image data.

With respect to the format used for outputting the compressed image data, for example, the IEEE1394 format is used. Here, the compressed 60i image signal recorded on the recording device 24 can be reproduced from the recording medium later in the recording device 24, and output from the output device 16.

Next, the inverse conversion process to be carried out by the image-editing device is explained. In this case, the inverse conversion process is a process which inversely converts the compressed 60i image signal to a compressed 24p image signal in the same manner as embodiment 1.

The compressed 60i image signal, output from the output device 16 of the image editing device, is input to the input device 17 of the image-editing device. The compressed 60i image signal to be input to the input device 17 is inversely converted into a 24p image signal, and further subjected to an expanding process. The inversely converting process and expanding process are carried out by the frame-data extracting control device 111, the recording/reproducing device 18 and the image expanding device 19. These processes are the same as those of embodiment 1; therefore, the explanation thereof is omitted.

Here, the time-code converter 130 extracts 60iTC from the compressed 60i image signal input to the input device 17, and converts the signal to 24pTC. The time-code converter 130 outputs the generated 24pTC to the time-code output device 125. The time-code output device 125 converts 24pTC to information (for example, display information) that is recognized by the user, and outputs the resulting signal. With respect to the time-code output device 125, the image output device 122 may be compatibly used when display information is output. The user carries out editing processes while viewing images output by the image output device 110 and time-code information output by the time-code output device 125. More specifically, the user specifies the starting point and terminal point of an image in the image-editing device based on a time-code basis.

The user carries out the above-mentioned editing processes while recognizing the time-code information output by the time-code output device 125 and image information displayed by the image output device 122. Upon editing, the recording and editing processes of the 24p image signal are carried out, with the 24p image signal and 24pTC being phase-synchronized with each other. More specifically, the editing device 112 records the editing start point, editing terminal point and the order thereof, and while the image portions are displayed by the image output device 110 based upon the record, a plurality of image portions specified by the user are arranged; thus, the editing processes are completed. In this case, the editing start point and the editing terminal point are specified by the user on a 24pTC basis. Further, the user carries out the above-mentioned editing processes while viewing an image on the image output device 110 and a time code on the time-code output device 125.

The 24p editing signal that has been subjected to the editing process is again recorded on the recording medium by the recording/reproducing device 18. The editing processes to be carried out by the image-editing device are basically the same as those explained in embodiment 1.

Figure 7:
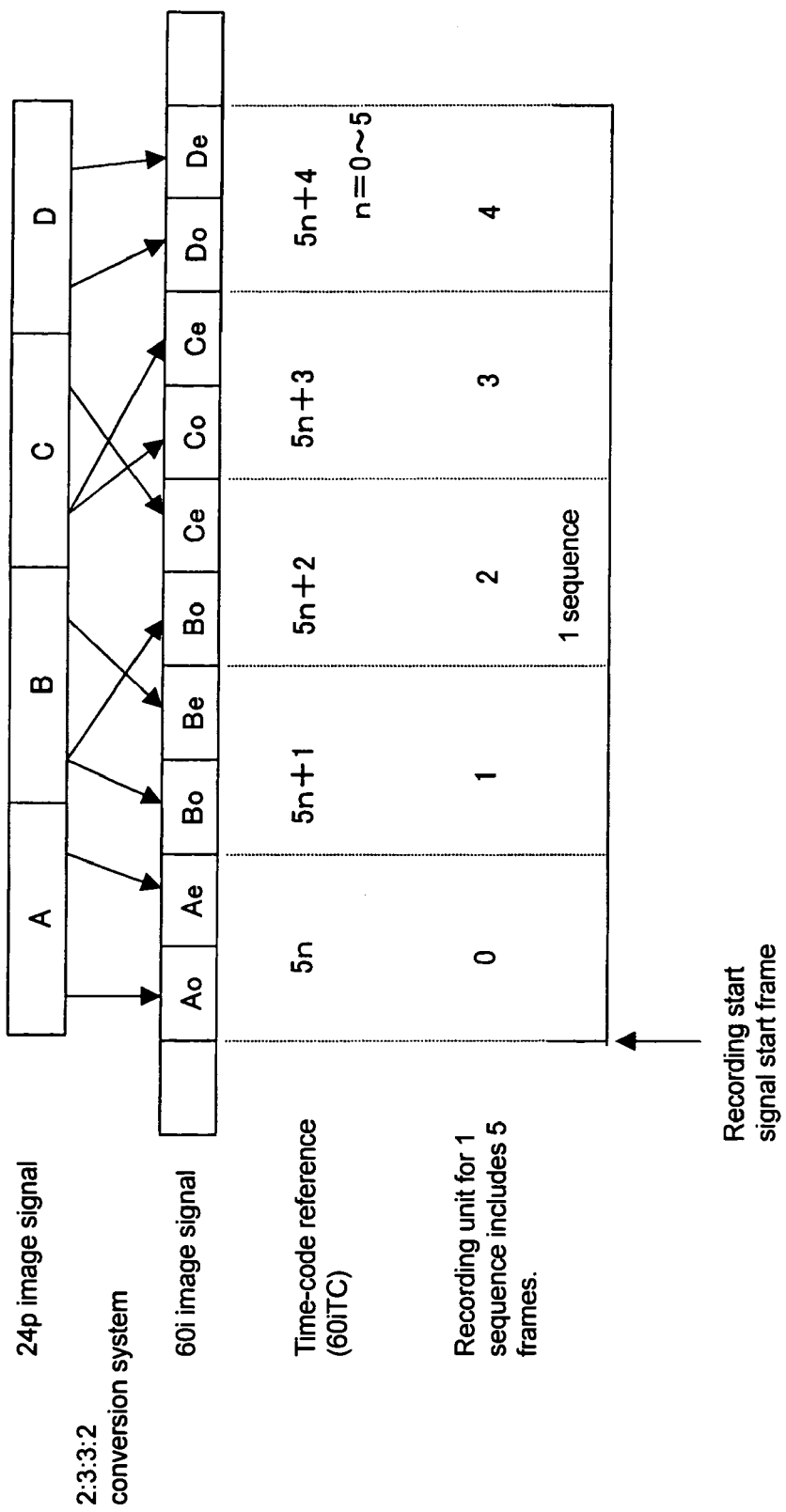
FIG. 7 is a schematic drawing that shows a relative relationship between a 2:3:3:2 pull-down control process and an image-pickup recording unit in embodiment 2.

FIG. 7 is a schematic drawing that shows a relative relationship between a 2:3:3:2 pull-down conversion process and an image-pickup recording unit in accordance with the present embodiment. When the 24p image signal is converted to a 60i image signal by a 2:3:3:2 pull-down conversion process, the recording start signal generator 23 is made in phase-synchronism with 60iTC read from the recording medium 100 to set a recording start signal. The recording/reproducing unit 24 sets a recording start point (60iTC (5n)) based upon the recording start signal thus set, and starts a joining image-pickup recording process. Moreover, on a 60iTC frame basis, partial extracting and combining processes of frame data corresponding to the respective pieces of field data are carried out from the compressed 24p image signal, in synchronism with 60iTC (5n), 60iTC (5n+1), 60iTC (5n+2), 60iTC (5n+3) and 60iTC (5n+4). These processes have been already discussed in embodiment 1. Thus, while these processes are being periodically repeated, the resulting image signal is recorded on the recording/reproducing device 24 so that the joining image-pickup recording process is carried out.

Figure 8:
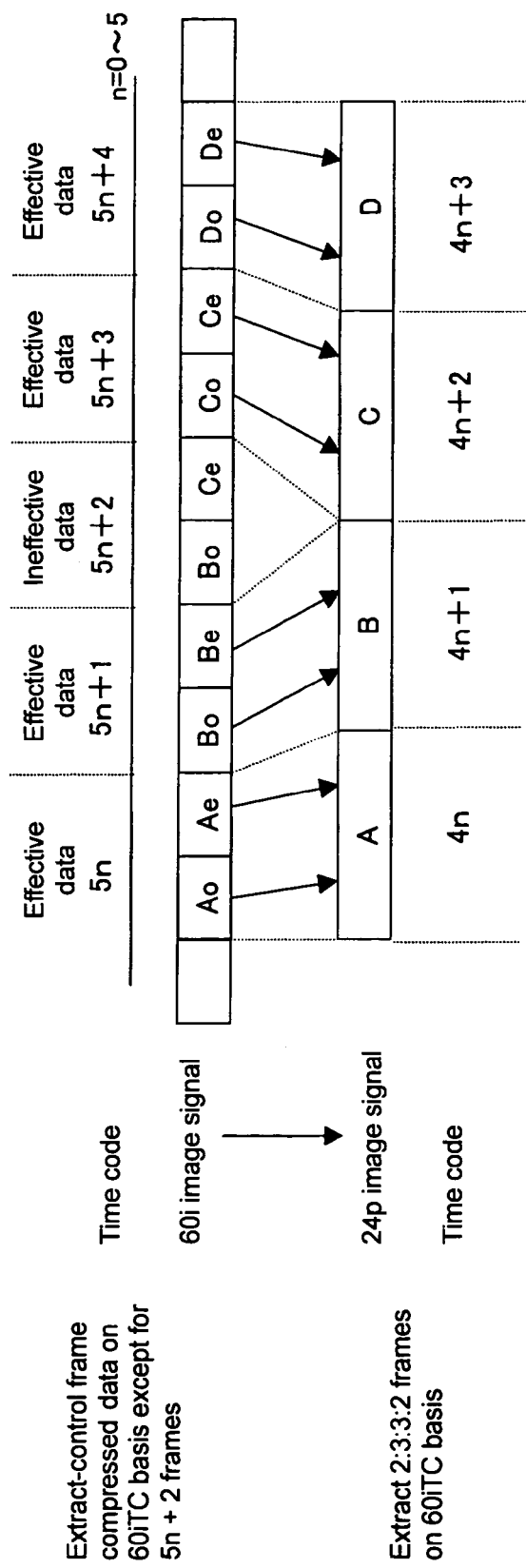
FIG. 8 is a schematic drawing that shows a state at the time of inverse conversion in embodiment 2.

FIG. 8 is a schematic drawing that shows the operations of the frame data extracting control device 111 of the present invention. Upon inversely converting the compressed 60i image signal to a compressed 24p image signal, based upon the 60iTC time-code criteria, pieces of compressed field data (Bo, Ce) corresponding to 60iTC (5n+2) are read, and ignored. Pieces of compressed field data (Ao, Ae), (Bo, Be), (Co, Ce) and (Do, De) corresponding to 60iTC(5n), 60iTC (5n+1), 60iTC(5n+3) and 60iTC (5n+4) (n=integer of 0 to 5) are converted to compressed frame data of the compressed 24p image signal corresponding to 24pTC(4n), 24pTC(4n+1), 24pTC(4n+2) and 24pTC(4n+3). Thus, it is possible to achieve a natural image conversion process with smooth movements being maintained.

Figure 9:
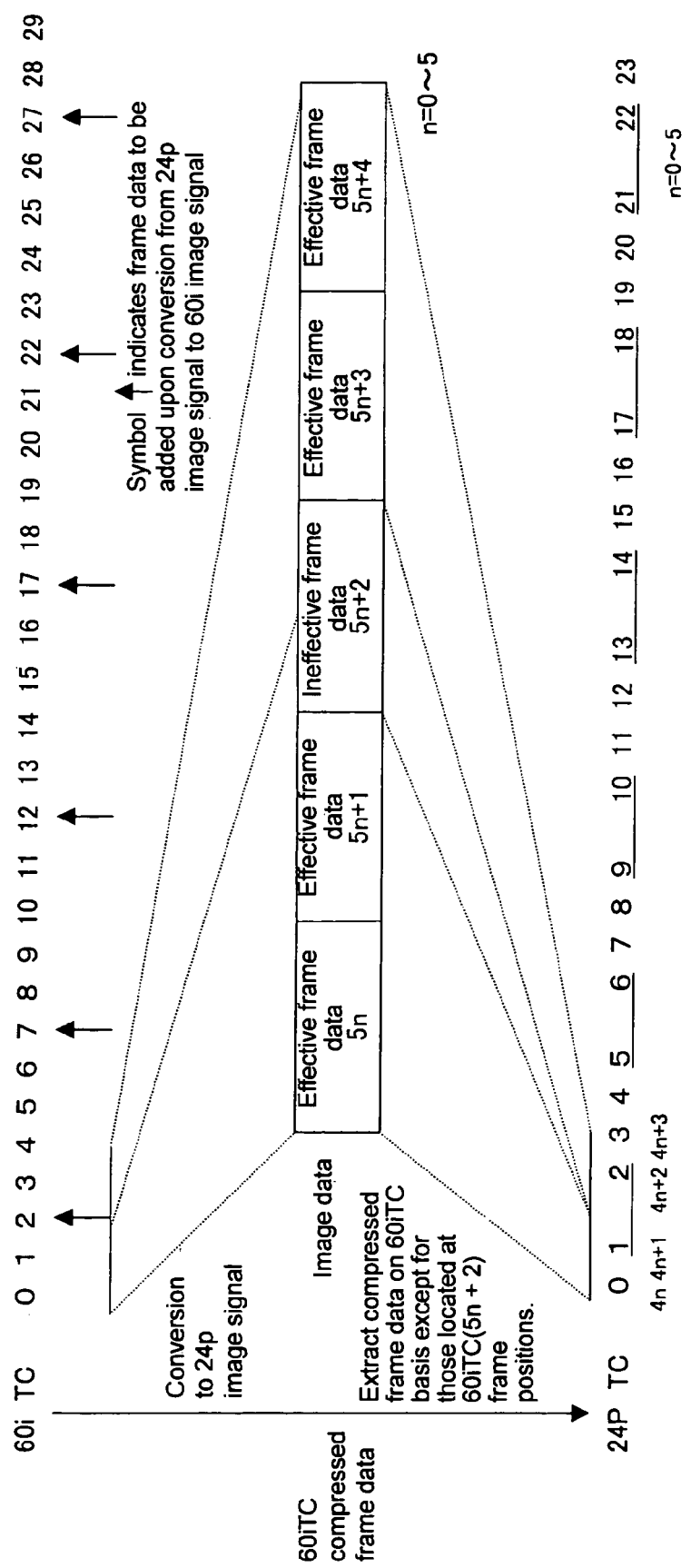
FIG. 9 is a schematic drawing that shows a state at the time of time-code conversion in embodiment 2.

The following description discusses a time-code converting operation (60iTC→24pTC) carried out by the time-code converter 130. The time-code converter 130 deletes 60iTC (2), (7), (12), (17), (22) and (27) that correspond to 60iTC (5n+2), and extracts the rest of 60iTC (5n), 60iTC (5n+1), 60iTC (5n+3) and 60iTC(5n+4) (in which n is an integer of 0 to 5). Thus, the time-code converter 130 generates 24pTC (4n), 24pTC (4n+1), 24pTC(4n+2) and 24pTC(4n+3) (in which n is an integer of 0 to 5). The generated 24pTC is restored while being made phase-synchronized with the image. FIG. 9 shows a relative relationship between the time-code converting operation (60iTC→24pTC) carried out by the time-code converter 130 and the inversely converting operation from the 24p image signal to the 60i image signal.

Figure 10:
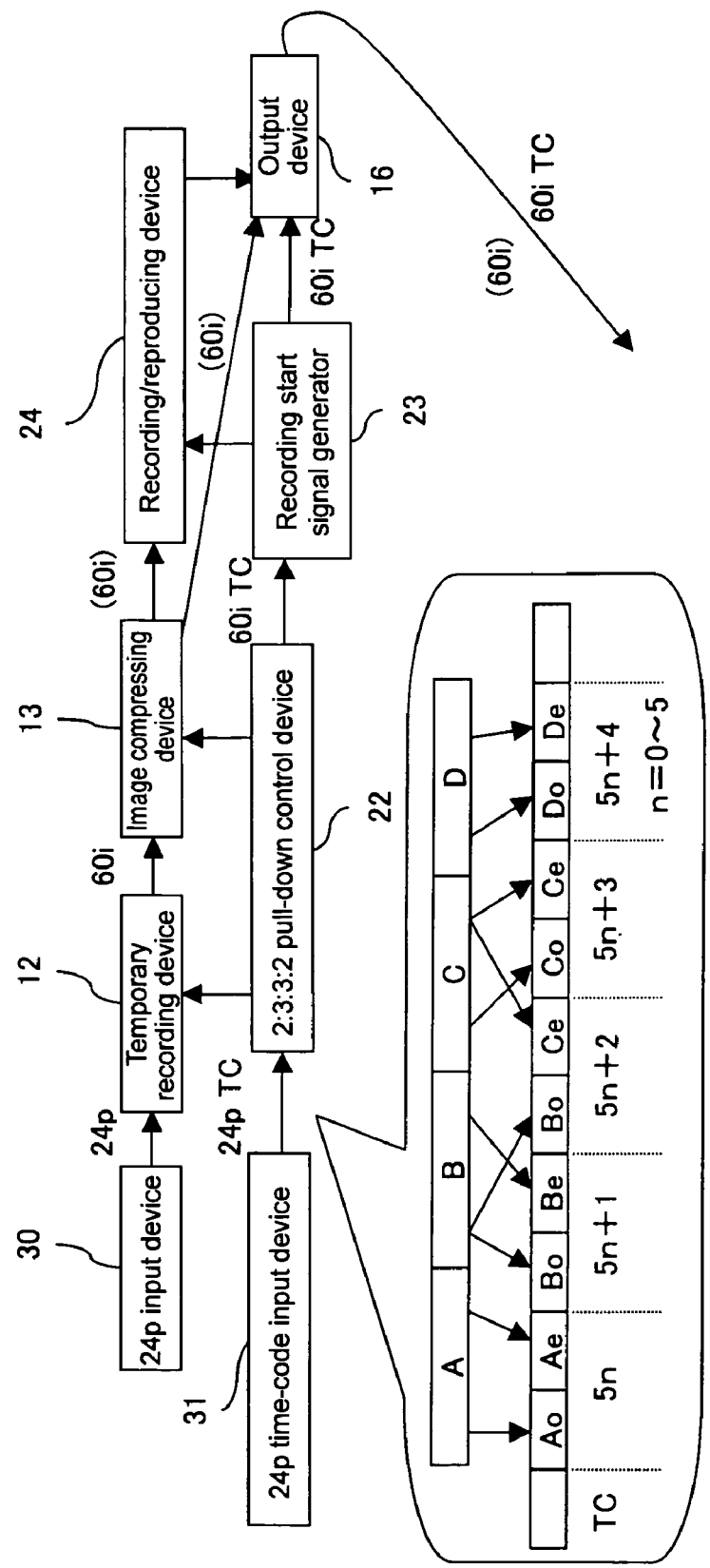
FIG. 10 is a block diagram that shows a structure of an image conversion system which is a modified example of embodiment 2.

FIG. 10 shows a structure of an image conversion system that is a modified example of embodiment 2. This image conversion system is provided with a temporary recording device 12, an image compressing device 13, a 2:3:3:2 pull-down control device 22, a recording start signal generator 23, a recording/reproducing device 24 and an output device 16, and these constituent parts are the same as those parts in the imaging system of embodiment 2. In addition to the above-mentioned constituent parts, the image conversion system is provided with a 24p image signal input device 30 and a 24p time-code input device 31. The 24p image signal input device 30 and the 24p time-code input device 31 are parts that exert interface functions for receiving the 24p image signal and 24pTC from outside of the image conversion system. These provide functions that replace the imaging device 11 and the time-code reading device 21 in the imaging system.

In the image conversion system, the 24pTC to be input to the 24p time-code input device 31 needs to be converted to the 60iTC. This time-code converting operation is carried out by the 2:3:3:2 pull-down control device 22. The time-code conversion is executed by adding 60iTC(5n+2), that is, 60iTC(2), 60iTC(7), 60iTC(12), 60iTC(17), 60iTC(22) and 60iTC(27), to 24pTC(4n), 24pTC(4n+1), 24pTC(4n+2) and 24pTC(4n+3).

Additionally, in embodiment 2, the present invention is achieved by a structure in which one sequence of the 2:3:3:2 pull-down conversion process is used as a frame value. However, the present invention is also achieved by using a structure in which information of one sequence of the 2:3:3:2 pull-down conversion process is written in a user area of the recording medium.

Moreover, in embodiment 2, the present invention is achieved by using the 2:3:3:2 pull-down conversion process. In addition to this, the present invention is also achieved by using the 2:3:2:3 pull-down conversion processor the 2:2:2:4 pull-down conversion process.

Embodiment 3

As described above, the pull-down conversion process includes various conversion formats such as the 2:3:3:2 pull-down conversion process, 2:3:2:3 pull-down conversion process, 2:2:2:4 pull-down conversion process, 2:2:3:3 pull-down conversion process and 3:3:2:2 pull-down conversion process. Each of these conversion systems has its inherent advantages, although it also has its inherent disadvantages. For this reason, these conversion systems need to be used separately depending on purposes of use of images.

The present invention provides an imaging system and an image conversion system which can properly use the various image conversion systems in a separate manner.

Figure 11:
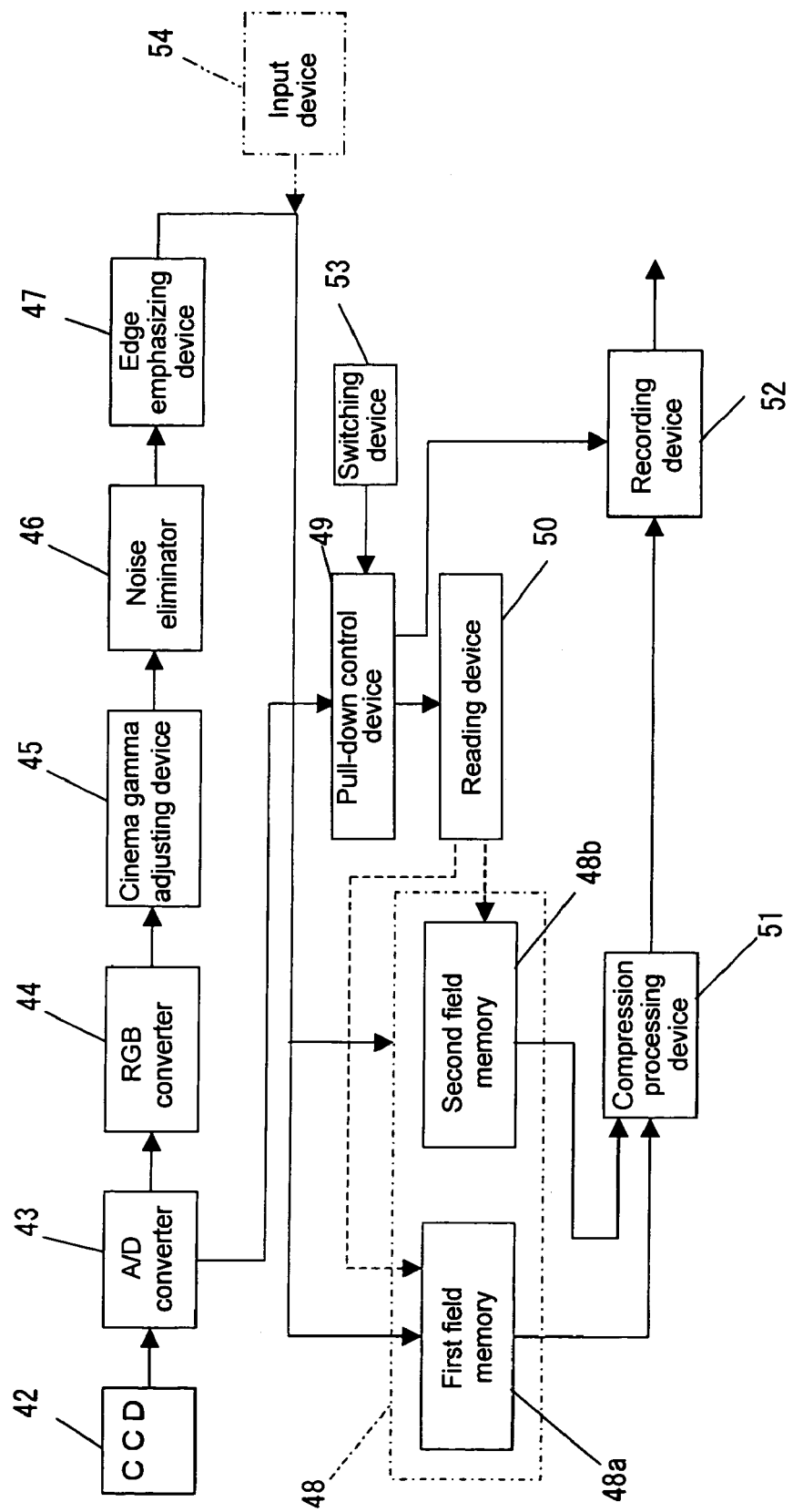
FIG. 11 is a block diagram that shows a structure of an image conversion system in embodiment 3 of the present invention.

FIG. 11 is a block diagram that shows a structure of an imaging system of the present embodiment. After obtaining 24p image signals, this imaging system converts the picked-up 24p image signal to the 60i image signal in accordance with any one of the conversion systems among the 2:3:2:3 pull-down conversion process, 2:3:3:2 pull-down conversion process and 2:2:2:4 pull-down process.

This imaging system is provided with a CCD 42, an A/D converter 43, an RGB converter 44, a cinema gamma adjusting device 45, a noise eliminator 46, an edge emphasizing device 47, a temporary recording device 48, a pull-down control device 49, a reading device 50, a compression processing device 51, a recording device 52 and a switching device 53.

The CCD 42 converts light that is directed from a subject into an electric signal. The A/D converter 43 converts the electric signal into a digital image signal. The A/D converter 43 reads the electric signal from the CCD 42 in an image format of 24 frames/second so that the electric signal of the CCD 42 is converted to a digital image signal having the image format of 24 frames/second. The RGB converter 44 converts the digital image signal to a digital RGB signal. The cinema gamma adjusting device 45 carries out a cinema gamma adjustment on the digital RGB signal. The noise eliminator 46 carries out a noise eliminating process on the digital RGB signal that has been cinema-gamma-adjusted. The edge emphasizing device 47 carries out an edge-emphasizing process on the digital RGB signal that has been subjected to the noise-eliminating process. The digital RGB signal formed in this manner provides a 24p image signal. The temporary recording device 48 temporarily records the 24p image signal. The temporary recording device 48 is provided with a first field memory 48a and a second field memory 48b. The first field memory 48a extracts field data consisting of horizontal line signals placed at odd line positions among the respective horizontal line signals constituting the 24p image signal, and temporarily records the data. The second field memory 48b extracts field data consisting of horizontal line signals placed at even line positions among the respective horizontal line signals constituting the 24p image signal.

The reading device 50 reads the respective field data temporarily stored in the first and second field memories 8a and 8b based upon anyone of the conversion systems of the (2:3:2:3 pull-down conversion system), (2:3:3:2 pull-down conversion system) and (2:2:2:4 pull-down conversion system).

The pull-down control device 49 controls the reading timing in which the reading device 50 reads the respective field data from the first and second field memories 8a and 8b based upon any one of the conversion systems of the (2:3:2:3 pull-down conversion system), (2:3:3:2 pull-down conversion system), and (2:2:2:4 pull-down conversion system). The detailed descriptions of the respective conversion systems will be given later. Thus, the 60i image signal, which has been converted by any one of the systems, is output from the temporary recording device 48.

The compression processing device 51 compresses the 60i image signal read from the temporary recording device 48 (first and second field memories 48a and 48b). The recording device 52 records the 60i image signal that has been compressed in the compression processing device 10 on a recording medium (video tape, hard disk device, optical disk, etc.), not shown.

The switching device 53 selects any one of the 2:3:2:3 pull-down conversion system, 2:3:3:2 pull-down conversion system and 2:2:2:4 pull-down conversion system as the conversion system to be used for converting the 24p video signal to the 60i image signal, and outputs the resulting command of selection to the pull-down control device 49. The selection of the conversion system by the switching device 42 is carried out, for example, through the switch (not shown) placed on an operation panel (not shown) of the imaging system.

In the present embodiment, the imaging device is constituted by the CCD 42, the A/D converter 43, the RGB converter 44, the cinema gamma adjusting device 45, the noise eliminator 46 and the edge-emphasizing device 47. The pull-down control device 49 includes the 2:3:2:3 pull-down control device, the 2:3:3:2 pull-down control device and the 2:2:2:4 pull-down control device.

The following description discusses an image-pickup operation carried out by the imaging system.

Since the sequence of processes up to the edge-emphasizing process of the digital RGB signal carried out by the edge-emphasizing device 47 is the same as that of the conventional device, the description of the signal processing up to this point is omitted. The present imaging system is characterized by signal processing to be carried out on the 24p image signal output from the edge emphasizing device 47.

In the present imaging system, upon converting the 24p image signal to the 60i image signal, any one of the conversion systems of the 2:3:2:3 pull-down conversion system, 2:3:3:2 pull-down conversion system and 2:2:2:4 pull-down conversion system may be applied. First, the command signal indicating which conversion system to be used is input to the switching device 13. The inputting process of the command signal is carried out by the operator through, for example, a switch (not shown) attached to an operation panel (not shown) of the imaging system.

Upon receipt of the command input of the conversion system, the switching device 13 outputs a command signal for the conversion system to the pull-down control device 49. Upon receipt of the command signal, the pull-down control device 49 carries out a reading control on the reading device 50 based upon the specified conversion system.

The following explanation is given by exemplifying a case in which, in the 24p image signal, pieces of consecutive first frame data (A) to fourth frame data (D) are converted to pieces of consecutive first field data (1) to tenth field data (10). Here, the first frame data (A) to the fourth frame data (D) in the 24p image signal are decomposed into odd field data (Ao to Do) and even field data (Ae to De). The odd field data (Ao to Do) are temporarily recorded in the first field memory 48a. The even field data (Ae to De) are temporarily recorded in the second field memory 48b. The odd field data (Ao to Do) and even field data (Ae to De), temporarily recorded in the first and second field memories 48a and 48b, are read by the reading device 50 in accordance with a predetermined reading sequence to form the first field data (1) to the tenth field data (10).

The following description discusses the conversion operation in the case when the 2:3:3:2 pull-down conversion system is specified. In this case, the following reading control is given to the reading device 50 by the pull-down control device 49.

Figure 12A:
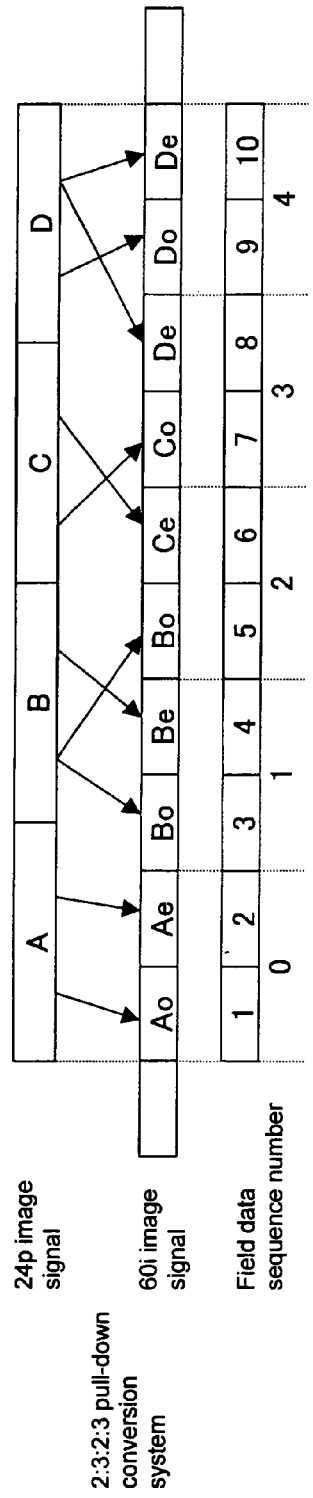
FIG. 12 is a drawing that shows a specific conversion process in each conversion system.

As shown in FIG. 12A, the odd field data (Ao) of the first frame data (A) are read as the first field data (1). The even field data (Ae) of the first frame data (A) are read as the second field data (2).

The odd field data (Bo) of the second frame data (B) are read as the third field data (3). The even field data (Be) of the second frame data (B) are read as the fourth field data (4).

The odd field data (Bo) of the second frame data (B) are read as the fifth field data (5). The even field data (Ce) of the third frame data (C) are read as the sixth field data (6).

The odd field data (Co) of the third frame data (C) are read as the seventh field data (7). The even field data (De) of the fourth frame data (D) are read as the eighth field data (8).

The odd field data (Do) of the fourth frame data (D) are read as the ninth field data (9). The even field data (De) of the fourth frame data (D) are read as the tenth field data (10).

The following description discusses the conversion operation in the case when the 2:3:3:2 pull-down conversion system is specified. In this case, the following reading control is given to the reading device 50 by the pull-down control device 49.

Figure 12B:
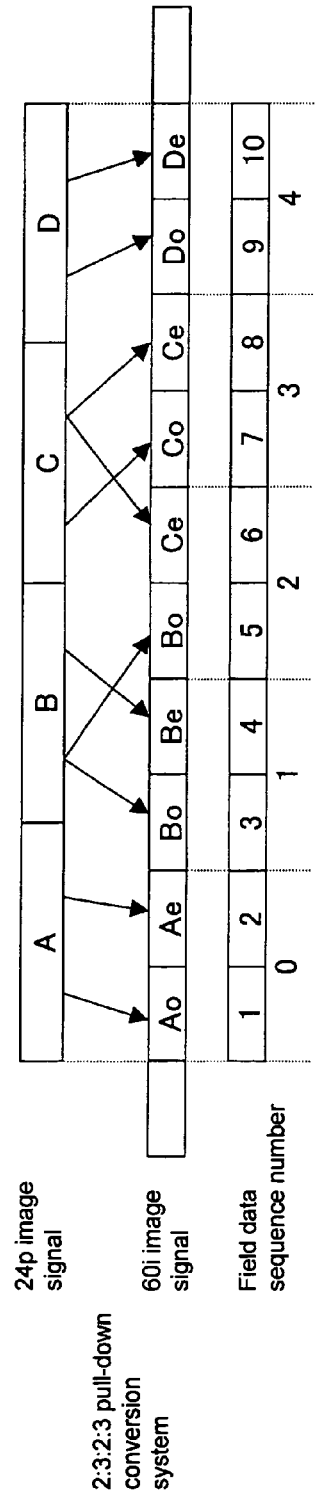

As shown in FIG. 12B, the odd field data (Ao) of the first frame data (A) are read as the first field data (1). The even field data (Ae) of the first frame data (A) are read as the second field data (2).

The odd field data (Bo) of the second frame data (B) are read as the third field data (3). The even field data (Be) of the second frame data (B) are read as the fourth field data (4).

The odd field data (Bo) of the second frame data (B) are read as the fifth field data (5). The even field data (Ce) of the third frame data (C) are read as the sixth field data (6).

The odd field data (Co) of the third frame data (C) are read as the seventh field data (7). The even field data (Ce) of the third frame data (C) are read as the eighth field data (8).

The odd field data (Do) of the fourth frame data (D) are read as the ninth field data (9). The even field data (De) of the fourth frame data (D) are read as the tenth field data (10).

The following description discusses the conversion operation in the case when the 2:2:2:4 pull-down conversion system is specified. In this case, the following reading control is given to the reading device 50 by the pull-down control device 49.

Figure 12C:
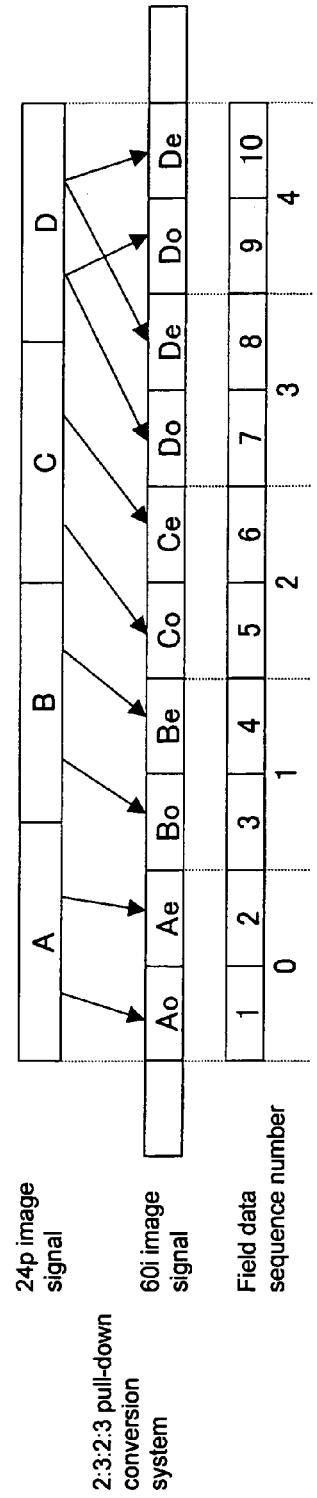

As shown in FIG. 12C, the odd field data (Ao) of the first frame data (A) are read as the first field data (1). The even field data (Ae) of the first frame data (A) are read as the second field data (2).

The odd field data (Bo) of the second frame data (B) are read as the third field data (3). The even field data (Be) of the second frame data (B) are read as the fourth field data (4).

The odd field data (Co) of the third frame data (C) are read as the fifth field data (5). The even field data (Ce) of the third frame data (C) are read as the sixth field data (6).

The odd field data (Do) of the fourth frame data (D) are read as the seventh field data (7). The even field data (De) of the fourth frame data (D) are read as the eighth field data (8).

The odd field data (Do) of the fourth frame data (D) are read as the ninth field data (9). The even field data (De) of the fourth frame data (D) are read as the tenth field data (10).

Here, the first to tenth field data (1 to 10), generated by the above-mentioned conversion processes, correspond to the following field data in frames having consecutive sequence numbers (0 to 4) in the 60i image signal.

The first field data (1) forms odd field data of the frame having sequence number (0). The second field data (2) forms even field data of the frame having sequence number (0).

The third field data (3) forms odd field data of the frame having sequence number (1). The fourth field data (4) forms even field data of the frame having sequence number (1). The fifth field data (5) forms odd field data of the frame having sequence number (2). The sixth field data (6) forms even field data of the frame having sequence number (2).

The seventh field data (7) forms odd field data of the frame having sequence number (3). The eighth field data (8) forms even field data of the frame having sequence number (3).

The ninth field data (9) forms odd field data of the frame having sequence number (4). The tenth field data (10) forms even field data of the frame having sequence number (4).

After the 24p image signal has been converted to a 60i image signal in accordance with the corresponding conversion system, the converted 60i image signal is compressed by the compression processing device 51. The 60i image signal thus compressed is recorded on a recording medium (not shown) in the recording device 52. Here, the recording device 52 has conversion-system information input thereto from the pull-down control device 49, and the recording device 52 records the conversion-system information of the 60i image signal being recorded, on the recording medium. The conversion-system information is written in, for example, the user's bit area of the 60i image signal.

As described above, the imaging system converts the 24p image signal to a 60i image signal in accordance with a desired one of the conversion systems, and records the resulting signal; and the respective conversion systems have the following advantages and disadvantages.

2:3:2:3 Pull-Down Conversion System

[Advantages]

This conversion system is a conversion system that mainly aims at an image signal that is subjected to field compression, and in this conversion system, pieces of consecutive field data in the 24p image signal are evenly distributed and placed over the respective fields of the 60i image signal; therefore, this system is suitably used for converting image signals containing images having active movements such as movies.

[Disadvantages]

Since this conversion system aims at an image signal that is subjected to field compression, it takes a long period of time in converting an image signal that has been frame-compressed.

Upon converting an image signal that has been frame-compressed, this system causes comparatively large degradation in image quality due to compressing/expanding processes.

More specifically, the conversion generates pieces of field data that are not continuous in terms of time, and since the amount of conversion of discontinuous data in terms of time is greater as compared to the other conversion systems, this system becomes most unsuitable in the case when a slow reproducing process or a still-image reproducing process is carried out after conversion.

2:3:3:2 Pull-Down Conversion System

[Advantages]

Upon converting the 60i image signal to a 24p image signal, the conversion is made by omitting the third frame so that no degradation in image quality occurs due to compressing/expanding processes.

Pieces of consecutive field data in the 24p image signal are evenly distributed and placed over the respective fields of the 60i image signal; therefore, this system is suitably used for converting image signals containing images having active movements such as movies.

[Disadvantages]

Strictly speaking, the conversion causes field images that are discontinuous in terms of time, and since the amount of conversion of discontinuous data in terms of time is greater, although not so great as that of the 2:3:2:3 pull-down conversion system, this system is unsuitable in the case when a slow reproducing process or a still-image reproducing process is carried out after conversion.

2:2:2:4 Pull-Down Conversion System

[Advantages]

This conversion system is a conversion system that mainly aims at an image signal that is subjected to frame compression, and in the case of an image signal that has been frame-compressed, this system carries out the processes without requiring any processing time.

Upon converting an image signal that has been frame-compressed, this system causes no degradation in image quality due to compressing/expanding processes.

This system generates the least amount of field images that are discontinuous in terms of time; therefore, this system is suitably used in the case when a slow reproducing process or a still-image reproducing process is carried out after conversion.

[Disadvantages]

Since two frames of the five frames are constituted by the same image, this system is unsuitable for conversion of image signals that contain images having active movements.

In the imaging system 1 of the present embodiment, by reviewing the state of an image to be picked up based upon the above-mentioned advantages and disadvantages of the respective conversion systems, an optimal conversion system for the image signal to be picked up can be selected.

In the above-mentioned embodiment 3, the present invention is applied to an imaging system provided with a recording device 52; however, the present invention can of course be applied to an imaging system which is not provided with a recording device 52, and externally outputs the 60i image-pickup signal as converted so that it is recorded on a recording medium of an external recording device.

Moreover, in the above-mentioned embodiment 3, the present invention is applied to an imaging system provided with an imaging device; however, in addition to this arrangement, the present invention can be applied to an image conversion system in which no imaging device is installed. In this case, the image conversion system refers to a device in which the input 24p image signal is converted to a 60i image signal based upon any desirably selected one of the conversion systems including the 2:3:2:3 pull-down conversion system, 2:3:3:2 pull-down conversion system and 2:2:2:4 pull-down conversion system.

As shown in FIG. 11, this image conversion system has an arrangement in which the CCD 42, the A/D converter 43, the RGB converter 44, the cinema gamma adjusting device 45, the noise eliminator 46 and the edge-emphasizing device 47 are omitted from the construction of the imaging system, with an input device 54 to which the 24p image signal is input being added thereto, and with respect to the converting processes of images, completely the same processes as those of the imaging system are carried out.

Moreover, in the above-mentioned imaging system and image conversion system, the picked-up 24p image signal is converted to a 60i image signal based upon any desirably selected one of the conversion systems including the 2:3:2:3 pull-down conversion system, 2:3:3:2 pull-down conversion system and 2:2:2:4 pull-down conversion system. The present invention is not intended to be limited to this arrangement, and the picked-up 24p image signal may be converted to a 60i image signal based upon either desired one of the 2:3:2:3 pull-down conversion system and the 2:3:3:2 pull-down conversion system.

In the same manner, the picked-up 24p image signal may be converted to a 60i image signal based upon either desired one of the 2:3:2:3 pull-down conversion system and the 2:2:2:4 pull-down conversion system.

Moreover, the picked-up 24p image signal may be converted to a 60i image signal based upon either desired one of the 2:3:3:2 pull-down conversion system and the 2:2:2:4 pull-down conversion system.

Figure 13:
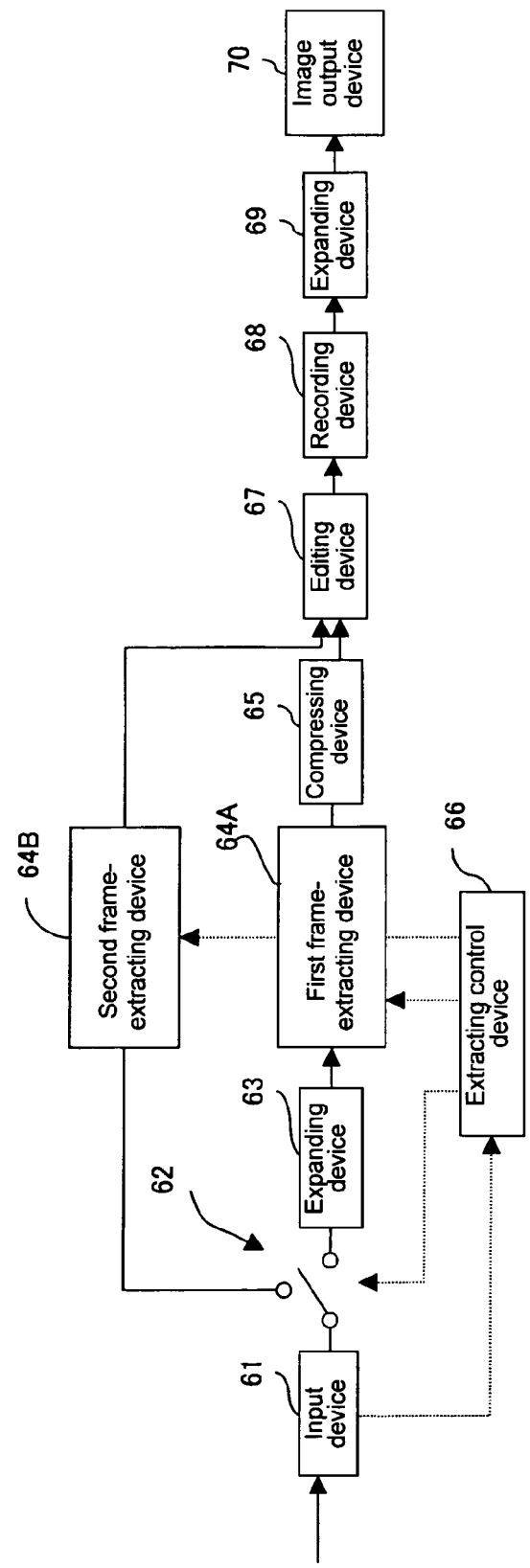
FIG. 13 is a drawing that shows a structure of an image inverse conversion system that forms a pair together with an imaging system of embodiment 3 of the present invention.
Figure 14:
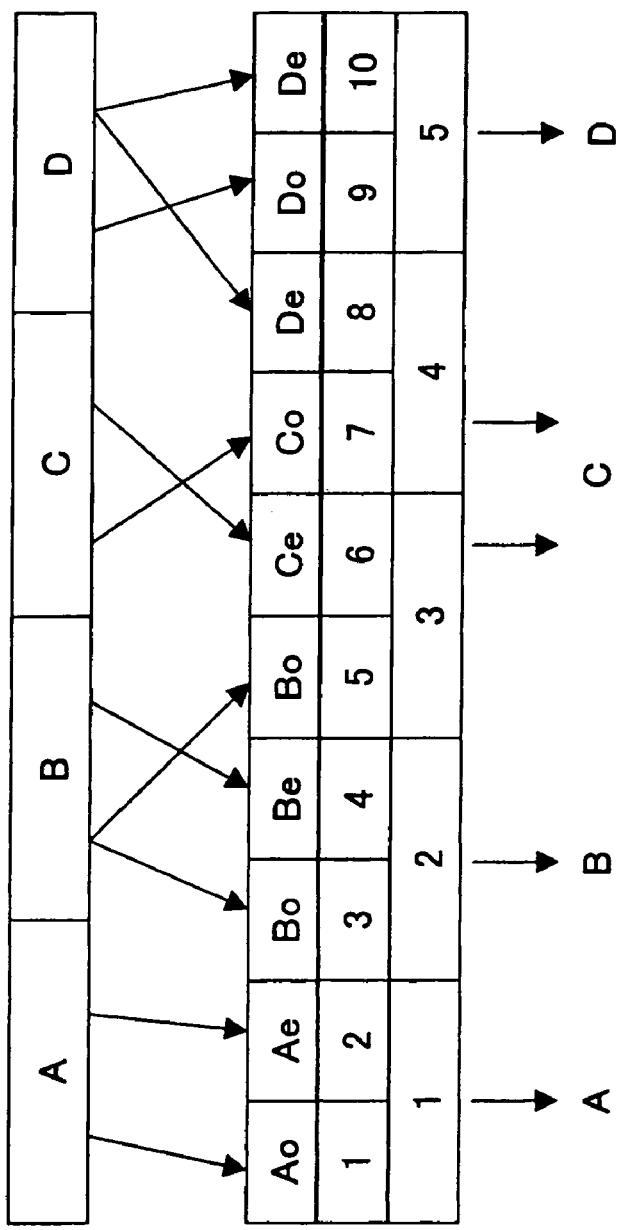
FIG. 14 is a drawing that shows an example of an image conversion system.

Referring to FIG. 13, the following description discusses an image inverse conversion device in which the 60i image signal formed in the above-mentioned imaging system (60i image signal derived from the conversion of the 24p image signal carried out based upon a desired conversion system) is inversely converted to the 24p image signal.

This image inverse conversion device is provided with an input device 61, a switch 62, an expanding device 63, a first frame-extracting device 64A, a second frame-extracting device 64B, a compressing device 65 and an extracting control device 66.

Here, in order to design this image inverse conversion device as an image-editing device, in addition to the above-mentioned devices, an editing device 67, a recording device 68, an expanding device 69 and an image output device 70 are installed therein. FIG. 13 shows a structure of an image conversion system, which functions as an image-editing device.

The following description discusses the operation of this image inverse conversion device. When a 60i image signal is input to the input device 61, the input device 61 reads the conversion system information recorded on the user's bit or the like of the image signal, and outputs the conversion system information to the frame-extracting control device 66.

Upon receipt of the conversion system information, the extracting control device 66 switches the switch 62 in accordance with the conversion system. More specifically, in the case when the 60i image signal to be input has been converted through the 2:3:2:3 pull-down conversion system, the signal needs to be once subjected to an expanding process. In contrast, in the case when it has been converted through the 2:3:3:2 pull-down conversion system or the 2:2:2:4 pull-down conversion system, the signal need not be subjected to the expanding process.

When the conversion system information indicating the conversion system is input to the extracting control device 66 from the input device 61, the extracting control device 66 connection-controls the switch 62 in the following manner, by taking these features of the respective conversion systems into consideration. In other words, the extracting control device 66 carries out the connection-controlling process by which the input device 61 and the expanding device 63 are connected by the switch 62. Here, upon receipt of the conversion system information indicating the 2:3:3:2 pull-down conversion system or the 2:2:2:4 pull-down conversion system from the input device 61, the extracting control device 66 connection-controls the switch 62 in the following manner. The extracting control device 66 carries out a connection control so that the input device 61 is connected to the second frame-extracting device 64B through the switch 62.

As described above, for each of the conversion systems, the signal transmission corresponding to the conversion system is carried out.

Next, the following description discusses a case in which a 60i image signal that has been converted through the 2:3:2:3 pull-down conversion system is input.

In this case, the 60i image signal is input to the expanding device 63 through the switch 62, and expanded therein. The 60i image signal, thus expanded, is input to a first frame-extracting device 64A. The first frame-extracting device 64A has conversion-system information preliminarily input thereto from the extracting control device 66, and carries out an inverse conversion process on the input 60i image signal in accordance with the specified conversion system (2:3:2:3 pull-down conversion system). The first frame-extracting device 64A carries out an inverse conversion process to the conversion process shown in FIG. 12A so that the 60i image signal is inversely converted to a 24p image signal. More specifically, the inverse conversion process is carried out in the following manner.

In this case, as shown in FIG. 12A, the first field data (1) is extracted as the odd field data (Ao) of the first frame data (A). The second field data (2) is extracted as the even field data (Ae) of the first frame data (A).

The third field data (3) is extracted as the odd field data (Bo) of the second frame data (B). The fourth field data (4) is extracted as the even field data (Be) of the second frame data (B).

The fifth field data (5) is extracted as the odd field data (Bo) of the second frame data (B). The sixth field data (6) is extracted as the even field data (Ce) of the third frame data (C).

The seventh field data (7) is extracted as the odd field data (Co) of the third frame data (C). The eighth field data (8) is extracted as the even field data (De) of the fourth frame data (D).

The ninth field data (9) is extracted as the odd field data (Do) of the fourth frame data (D). The tenth field data (10) is extracted as the even field data (De) of the fourth frame data (D).

As described above, the first frame-extracting device 64A extracts image signals from the 60i image signal in a predetermined extracting order so that a 24p image signal is generated. The 24p image signal, thus generated (inversely converted), is input to the compressing device 65, and compressed therein. The 24p image signal is compressed to form an image signal having a normal image format.

Next, the following description discusses a case in which a 60i image signal that has been converted through the 2:3:3:2 pull-down conversion system is input.

In this case, the 60i image signal is input to a second frame-extracting device 64B through a switch 62. The second frame-extracting device 64B has conversion-system information preliminarily input thereto from the extracting control device 66, and carries out an inverse conversion process on the input 60i image signal in accordance with the specified conversion system (2:3:3:2 pull-down conversion system). The second frame-extracting device 64B carries out an inverse conversion process to the conversion process shown in FIG. 12B so that the 60i image signal is inversely converted to a 24p image signal. More specifically, the inverse conversion process is carried out in the following manner.

In this case, as shown in FIG. 12B, the first field data (1) is extracted as the odd field data (Ao) of the first frame data (A). The second field data (2) is extracted as the even field data (Ae) of the first frame data (A).

The third field data (3) is extracted as the odd field data (Bo) of the second frame data (B). The fourth field data (4) is extracted as the even field data (Be) of the second frame data (B).

The fifth field data (5) is extracted as the odd field data (Bo) of the second frame data (B). The sixth field data (6) is extracted as the even field data (Ce) of the third frame data (C).

The seventh field data (7) is extracted as the odd field data (Co) of the third frame data (C). The eighth field data (8) is extracted as the even field data (Ce) of the third frame data (C).

The ninth field data (9) is extracted as the odd field data (Do) of the fourth frame data (D). The tenth field data (10) is extracted as the even field data (De) of the fourth frame data (D).

As described above, the second frame-extracting device 64B extracts image signals from the 60i image signal in a predetermined extracting order so that a 24p image signal is generated. The 24p image signal is allowed to form an image signal having a normal image format.

Next, the following description discusses a case in which a 60i image signal that has been converted through the 2:2:2:4 pull-down conversion system is input.

In this case, the 60i image signal is input to the second frame-extracting device 64B through the switch 62. The second frame-extracting device 64B has conversion-system information preliminarily input thereto from the extracting control device 66, and carries out an inverse conversion process on the input 60i image signal in accordance with the specified conversion system (2:2:2:4 pull-down conversion system). More specifically, the first frame-extracting device 64A carries out an inverse conversion process to the conversion process shown in FIG. 12C so that the 60i image signal is inversely converted to a 24p image signal.

In this case, as shown in FIG. 12C, the first field data (1) is extracted as the odd field data (Ao) of the first frame data (A). The second field data (2) is extracted as the even field data (Ae) of the first frame data (A).

The third field data (3) is extracted as the odd field data (Bo) of the second frame data (B). The fourth field data (4) is extracted as the even field data (Be) of the second frame data (B).

The fifth field data (5) is extracted as the odd field data (Co) of the third frame data (C). The sixth field data (6) is extracted as the even field data (Ce) of the third frame data (C).

The seventh field data (7) is extracted as the odd field data (Do) of the fourth frame data (D). The eighth field data (8) is extracted as the even field data (De) of the fourth frame data (D).

The ninth field data (9) is extracted as the odd field data (Do) of the fourth frame data (D). The tenth field data (10) is extracted as the even field data (De) of the fourth frame data (D).

As described above, the second frame-extracting device 64B extracts image signals from the 60i image signal in a predetermined extracting order so that a 24p image signal is generated. The 24p image signal, thus generated (inversely converted) is allowed to form an image signal having a normal image format.

In this manner, the 60i image signal that has been converted through the 2:3:2:3 pull-down conversion system is subjected to expanding/compressing processes, when inversely converted to a 24p image signal. For this reason, there is slight degradation in the image quality in the 24p image signal after the conversion due to these processes. In contrast, the 60i image signal that has been converted through the 2:3:3:2 pull-down conversion system and the 2:2:2:4 pull-down conversion system is not subjected to expanding/compressing processes, when inversely converted to a 24p image signal.

For this reason, there is no degradation in the image quality in the 24p image signal even after the conversion.

As described above, the 60i image signal is inversely converted to a 24p image signal. After the conversion, the 24p image signal may be externally output, or may be recorded on a recording medium (not shown) in the recording device 68. Moreover, the 24p image signal after the conversion may be subjected to an editing process in the editing device 67. After the editing process, the resulting 24p image signal may be externally output, or may be recorded on a recording medium (not shown) in the recording device 68. Here, the expanding device 69 and the image output device 70 are placed so as to allow the editor to recognize the image state during the editing process carried out by the editing device 67.

In the above-mentioned image inverse conversion device, the conversion system of the image signal is confirmed by reading conversion system information recorded on the image signal to be input. However, the conversion system of the input image signal can be confirmed based upon a repeated pattern of effective flag information (information indicating a field-data area that is made effective in the 60i image signal after the conversion) added to the image signal. Moreover, the conversion system can also be confirmed based upon recognition of a repeated pattern in the image field data.

INDUSTRIAL APPLICABILITY

As described above, in accordance with the present invention, by using a recording device and a display device of an interlace system of 60 fields/second, such as the NTSC system, that have been widely used, an image of 24 frames/second can be recorded or displayed.

Further, upon again editing the image, 24 frames at the time of the image-pickup process can be extracted and edited on a frame basis without any degradation in the image quality.

Moreover, upon again editing the image, a joining image-pickup process and a time-code editing process can be carried out by utilizing a time-code through an inexpensive structure.

Furthermore, it becomes possible to select an optimal image-conversion system depending on image-pickup purposes and editing methods.

The invention claimed is:

1. An imaging system comprising:
an imaging device which picks up an image signal in an image format of 24 frames/second;
a temporary recording device which temporarily records the image signal picked up by the imaging device; and
a 2:3:3:2 pull-down control device which reads the image signal from the temporary recording device in an interlace format of 60 fields/second,
wherein the 2:3:3:2 pull-down control device carries out the controlling steps of:
reading odd field data of the first frame as the first field data;
reading even field data of the first frame as the second field data;
reading odd field data of the second frame as the third and fifth field data;
reading even field data of the second frame as the fourth field data;
reading odd field data of the third frame as the seventh field data;
reading even field data of the third frame as the sixth and eighth field data;
reading odd field data of the fourth frame as the ninth field data; and
reading even field data of the fourth frame as the tenth field data.

2. The imaging system according to claim 1, further comprising a recording device which records the image signal converted by the 2:3:3:2 pull-down control device in an interlace system of 60 fields/second.

3. The imaging system according to claim 2, further comprising a compressing device which, with respect to the first to tenth field data read from the temporary recording device, combines paired field data with each other into a piece of frame data, and then compresses the resulting data,
wherein the recording device records the image signal that has been compressed by the compressing device.

4. An image conversion system comprising:
an input device to which an image signal having an image format of 24 frames/second is input;
a temporary recording device which temporarily records the image signal to be input to the input device; and
a 2:3:3:2 pull-down control device which reads the image signal from the temporary recording device in an interlace format of 60 fields/second,
wherein upon reading first to fourth consecutive frame data of the image signal from the temporary recording device as first to tenth consecutive field data, the 2:3:3:2 pull-down control device carries out the controlling steps of:
reading odd field data of the first frame as the first field data;
reading even field data of the first frame as the second field data;
reading odd field data of the second frame as the third and fifth field data;
reading even field data of the second frame as the fourth field data;
reading odd field data of the third frame as the seventh field data;
reading even field data of the third frame as the sixth and eighth field data;
reading odd field data of the fourth frame as the ninth field data; and
reading even field data of the fourth frame as the tenth field data.

5. An image-editing device comprising:
an input device to which a compressed image signal in an interlace system having a format of 60 fields/second, which has been combined and compressed on a frame basis, is input;
a frame-data extracting control device which selectively extracts from the input device the first, second, fourth and fifth frame data among the first to fifth frame data that form the compressed image signal and are consecutively arranged with each other;
a recording/reproducing device which records/reproduces the compressed image signal extracted by the frame-data extracting control device;
an image expanding device which expands the compressed image signal reproduced by the recording/reproducing device;
an image output device which displays the expanded image signal; and
an editing device which edits the compressed image signal reproduced from the recording/reproducing device on a frame basis.

6. An imaging system comprising:
an imaging device which picks up a first image signal in an image format of 24 frames/second;

a temporary recording device which temporarily records the first image signal picked up by the imaging device; and a 2:3:3:2 pull-down control device which reads the first image signal from the temporary recording device as a second image signal having an image format of 30 frames/second, wherein the 2:3:3:2 pull-down control device carries out the controlling steps of:

converting field data located at odd fields of a frame corresponding a time-code value 4n of the first image signal to field data located at odd fields of a frame corresponding a time-code value 5n of the second image signal;

converting field data located at even fields of a frame corresponding a time-code value 4n of the first image signal to field data located at even fields of a frame corresponding a time-code value 5n of the second image signal;

converting field data located at odd fields of a frame corresponding a time-code value 4n+1 of the first image signal to field data located at odd fields of a frame corresponding a time-code value 5n+1 of the second image signal;

converting field data located at even fields of a frame corresponding a time-code value 4n+1 of the first image signal to field data located at even fields of a frame corresponding a time-code value 5n+1 of the second image signal;

converting field data located at odd fields of a frame corresponding a time-code value 4n+1 of the first image signal to field data located at odd fields of a frame corresponding a time-code value 5n+2 of the second image signal;

converting field data located at even fields of a frame corresponding a time-code value 4n+2 of the first image signal to field data located at even fields of a frame corresponding a time-code value 5n+2 of the second image signal;

converting field data located at odd fields of a frame corresponding a time-code value 4n+2 of the first image signal to field data located at odd fields of a frame corresponding a time-code value 5n+3 of the second image signal;

converting field data located at even fields of a frame corresponding a time-code value 4n+2 of the first image signal to field data located at even fields of a frame corresponding a time-code value 5n+3 of the second image signal;

converting field data located at odd fields of a frame corresponding a time-code value 4n+3 of the first image signal to field data located at odd fields of a frame corresponding a time-code value 5n+4 of the second image signal; and converting field data located at even fields of a frame corresponding a time-code value 4n+3 of the first image signal to field data located at even fields of a frame corresponding a time-code value 5n+4 of the second image signal (where n is an integer of 0 to 5).

7. The imaging system according to claim 6, further comprising: a recording device that records the second image signal on a recording medium, wherein the recording device records the second image signal on the recording medium by a unit of 5 frames that corresponds to 1 sequence of the second image signal.

8. The imaging system according to claim 7, further comprising: a recording start signal generator that generates a recording start signal that is set to a unit of 5 frames that corresponds to 1 sequence of the second image signal.

9. The imaging system according to claim 7, further comprising: a time-code reading device that reads the time code of the second image signal recorded on the recording medium, wherein the recording device starts a recording process of the second image signal in phase-synchronism with the time code read by the time-code reading device.

10. The imaging system according to claim 7, wherein the recording device records the second image signal based upon an interlace system of 60 fields/second.

11. The imaging system according to claim 10, further comprising a compressing device which, with respect to the field data read from the temporary recording device, combines paired field data with each other into a piece of frame data, and then compresses the resulting data, wherein the recording device records the image signal that has been compressed by the compressing device.

12. An image conversion system comprising:

an input device to which a first image signal having an image format of 24 frames/second is input;

a temporary recording device which temporarily records the first image signal to be input to the input device; and a 2:3:3:2 pull-down control device which reads a second image signal from the temporary recording device in an image format of 30 frames/second, wherein the 2:3:3:2 pull-down control device carries out the controlling steps of:

converting field data located at odd fields of a frame corresponding a time-code value 4n of the first image signal to field data located at odd fields of a frame corresponding a time-code value 5n of the second image signal;

converting field data located at even fields of a frame corresponding a time-code value 4n of the first image signal to field data located at even fields of a frame corresponding a time-code value 5n of the second image signal;

converting field data located at odd fields of a frame corresponding a time-code value 4n+1 of the first image signal to field data located at odd fields of a frame corresponding a time-code value 5n+1 of the second image signal;

converting field data located at even fields of a frame corresponding a time-code value 4n+1 of the first image signal to field data located at even fields of a frame corresponding a time-code value 5n+1 of the second image signal;

converting field data located at odd fields of a frame corresponding a time-code value 4n+1 of the first image signal to field data located at odd fields of a frame corresponding a time-code value 5n+2 of the second image signal;

converting field data located at even fields of a frame corresponding a time-code value 4n+2 of the first image signal to field data located at even fields of a frame corresponding a time-code value 5n+2 of the second image signal;

converting field data located at odd fields of a frame corresponding a time-code value 4n+2 of the first image signal to field data located at odd fields of a frame corresponding a time-code value 5n+3 of the second image signal;

converting field data located at even fields of a frame corresponding a time-code value 4n+2 of the first image signal to field data located at even fields of a frame corresponding a time-code value 5n+3 of the second image signal;

converting field data located at odd fields of a frame corresponding a time-code value 4n+3 of the first image signal to field data located at odd fields of a frame corresponding a time-code value 5n+4 of the second image signal; and converting field data located at even fields of a frame corresponding a time-code value 4n+3 of the first image signal to field data located at even fields of a frame corresponding a time-code value 5n+4 of the second image signal (where n is an integer of 0 to 5).

13. An image-editing device comprising:

an input device to which a compressed image signal in an interlace system having a format of 60 fields/second, which has been combined and compressed on a frame basis, is input;

a frame-data extracting control device which extracts pieces of frame data located at frame positions corresponding to time-code values of 5n, 5n+1, 5n+3, 5n+4 (n: an integer of 0 to 5) from the input device;

a recording/reproducing device which records/reproduces the compressed image signal extracted by the frame-data extracting control device;

an image expanding device which expands the compressed image signal reproduced by the recording/reproducing device;

an image output device which displays the expanded image signal; and an editing device which edits the compressed image signal reproduced from the recording/reproducing device on a frame basis.

14. An imaging system comprising:

an imaging device which picks up an image signal in an image format of 24 frames/second;

a temporary recording device which temporarily records the image signal picked up by the imaging device;

a reading device which reads the image signal from the temporary recording device based upon an interlace system of 60 fields/second;

a 2:3:3:2 pull-down control device which controls the reading device;

a 2:3:2:3 pull-down control device which controls the reading device; and a switching device which switches control operations of the reading device between the 2:3:3:2 pull-down control device and the 2:3:2:3 pull-down control device, wherein, upon allowing the reading device to read first to fourth consecutive frame data of the image signal as first to tenth consecutive field data, the 2:3:3:2 pull-down control device carries out the controlling steps of:

reading odd field data of the first frame as the first field data;

reading even field data of the first frame as the second field data;

reading odd field data of the second frame as the third and fifth field data;

reading even field data of the second frame as the fourth field data;

reading odd field data of the third frame as the seventh field data;

reading even field data of the third frame as the sixth and eighth field data;

reading odd field data of the fourth frame as the ninth field data; and reading even field data of the fourth frame as the tenth field data, while, upon allowing the reading device to read first to fourth consecutive frame data of the image signal as first to tenth consecutive field data, the 2:3:2:3 pull-down control device carries out the controlling steps of:

reading odd field data of the first frame as the first field data;

reading even field data of the first frame as the second field data;

reading odd field data of the second frame as the third and fifth field data;

reading even field data of the second frame as the fourth field data;

reading odd field data of the third frame as the seventh field data;

reading even field data of the third frame as the sixth field data;

reading odd field data of the fourth frame as the ninth field data; and reading even field data of the fourth frame as the eighth and tenth field data.

15. An image conversion system comprising:

an input device to which an image signal having an image format of 24 frames/second is input;

a temporary recording device which temporarily records the image signal to be input to the input device;

a reading device which reads the image signal from the temporary recording device based upon an interlace system having an image format of 60 fields/second;

a 2:3:3:2 pull-down control device which controls the reading device;

a 2:3:2:3 pull-down control device which controls the reading device; and a switching device which switches control operations of the reading device between the 2:3:3:2 pull-down control device and the 2:3:2:3 pull-down control device, wherein, upon allowing the reading device to read first to fourth consecutive frame data of the image signal as first to tenth consecutive field data, the 2:3:3:2 pull-down control device carries out the controlling steps of:

reading odd field data of the first frame as the first field data;

reading even field data of the first frame as the second field data;

reading odd field data of the second frame as the third and fifth field data;

reading even field data of the second frame as the fourth field data;

reading odd field data of the third frame as the seventh field data;

reading even field data of the third frame as the sixth and eighth field data;

reading odd field data of the fourth frame as the ninth field data; and reading even field data of the fourth frame as the tenth field data, while, upon allowing the reading device to read first to fourth consecutive frame data of the image signal as first to tenth consecutive field data, the 2:3:2:3 pull-down control device carries out the controlling steps of:

reading odd field data of the first frame as the first field data;

reading even field data of the first frame as the second field data;

reading odd field data of the second frame as the third and fifth field data;

reading even field data of the second frame as the fourth field data;

reading odd field data of the third frame as the seventh field data;

reading even field data of the third frame as the sixth field data;

reading odd field data of the fourth frame as the ninth field data; and reading even field data of the fourth frame as the eighth and tenth field data.

16. An imaging system comprising:

an imaging device which picks up an image signal in an image format of 24 frames/second;

a temporary recording device which temporarily records the image signal picked up by the imaging device;

a reading device which reads the image signal from the temporary recording device based upon an interlace system of 60 fields/second;

a 2:3:3:2 pull-down control device which controls the reading device;

a 2:3:2:3 pull-down control device which controls the reading device;

a 2:2:2:4 pull-down control device which controls the reading device; and a switching device which switches control operations of the reading device among the 2:3:3:2 pull-down control device, the 2:3:2:3 pull-down control device and the 2:2:2:4 pull-down control device, wherein, upon allowing the reading device to read first to fourth consecutive frame data of the image signal as first to tenth consecutive field data, the 2:3:3:2 pull-down control device carries out the controlling steps of:

reading odd field data of the first frame as the first field data;

reading even field data of the first frame as the second field data;

reading odd field data of the second frame as the third and fifth field data;

reading even field data of the second frame as the fourth field data;

reading odd field data of the third frame as the seventh field data;

reading even field data of the third frame as the sixth and eighth field data;

reading odd field data of the fourth frame as the ninth field data; and reading even field data of the fourth frame as the tenth field data, while, upon allowing the reading device to read first to fourth consecutive frame data of the image signal as first to tenth consecutive field data, the 2:3:2:3 pull-down control device carries out the controlling steps of:

reading odd field data of the first frame as the first field data;

reading even field data of the first frame as the second field data;

reading odd field data of the second frame as the third and fifth field data;

reading even field data of the second frame as the fourth field data;

reading odd field data of the third frame as the seventh field data;

reading even field data of the third frame as the sixth field data;

reading odd field data of the fourth frame as the ninth field data; and reading even field data of the fourth frame as the eighth and tenth field data, while, upon allowing the reading device to read first to fourth consecutive frame data of the image signal as first to tenth consecutive field data, the 2:2:2:4 pull-down control device carries out the controlling steps of:

reading odd field data of the first frame as the first field data;

reading even field data of the first frame as the second field data;

reading odd field data of the second frame as the third field data;

reading even field data of the second frame as the fourth field data;

reading odd field data of the third frame as the fifth field data;

reading even field data of the third frame as the sixth field data;

reading odd field data of the fourth frame as the seventh and ninth field data; and reading even field data of the fourth frame as the eighth and tenth field data.

17. An imaging system comprising:

an input device to which an image signal having an image format of 24 frames/second is input;

a temporary recording device which temporarily records the image signal to be input to the input device;

a reading device which reads the image signal from the temporary recording device based upon an interlace system having an image format of 60 fields/second;

a 2:3:3:2 pull-down control device which controls the reading device;

a 2:3:2:3 pull-down control device which controls the reading device;

a 2:2:2:4 pull-down control device which controls the reading device; and a switching device which switches control operations of the reading device among the 2:3:3:2 pull-down control device, the 2:3:2:3 pull-down control device and the 2:2:2:4 pull-down control device, wherein, upon allowing the reading device to read first to fourth consecutive frame data of the image signal as first to tenth consecutive field data, the 2:3:3:2 pull-down control device carries out the controlling steps of:

reading odd field data of the first frame as the first field data;

reading even field data of the first frame as the second field data;

reading odd field data of the second frame as the third and fifth field data;

reading even field data of the second frame as the fourth field data;

reading odd field data of the third frame as the seventh field data;

reading even field data of the third frame as the sixth and eighth field data;

reading odd field data of the fourth frame as the ninth field data; and reading even field data of the fourth frame as the tenth field data, while, upon allowing the reading device to read first to fourth consecutive frame data of the image signal as first to tenth consecutive field data, the 2:3:2:3 pull-down control device carries out the controlling steps of:

reading odd field data of the first frame as the first field data;

reading even field data of the first frame as the second field data;

reading odd field data of the second frame as the third and fifth field data;

reading even field data of the second frame as the fourth field data;

reading odd field data of the third frame as the seventh field data;

reading even field data of the third frame as the sixth field data;

reading odd field data of the fourth frame as the ninth field data; and reading even field data of the fourth frame as the eighth and tenth field data, while, upon allowing the reading device to read first to fourth consecutive frame data of the image signal as first to tenth consecutive field data, the 2:2:2:4 pull-down control device carries out the controlling steps of:

reading odd field data of the first frame as the first field data;

reading even field data of the first frame as the second field data;

reading odd field data of the second frame as the third field data;

reading even field data of the second frame as the fourth field data;

reading odd field data of the third frame as the fifth field data;

reading even field data of the third frame as the sixth field data;

reading odd field data of the fourth frame as the seventh and ninth field data; and reading even field data of the fourth frame as the eighth and tenth field data.

* * * * *